(12) United States Patent
Kumpf

(10) Patent No.: US 6,370,592 B1
(45) Date of Patent: Apr. 9, 2002

(54) NETWORK INTERFACE DEVICE WHICH ALLOWS PERIPHERALS TO UTILIZE NETWORK TRANSPORT SERVICES

(75) Inventor: David A. Kumpf, Rocklin, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/964,073

(22) Filed: Nov. 4, 1997

(51) Int. Cl.$^7$ .................................................. G06F 9/00

(52) U.S. Cl. ........................ 709/328; 709/231; 709/227; 709/229

(58) Field of Search ................................. 709/231, 227, 709/230, 232, 301, 302, 305, 328, 329; 710/1, 4, 11, 27, 51, 105, 106, 131, 72; 370/389, 401; 379/93, 229

(56) References Cited

U.S. PATENT DOCUMENTS

| | | | | |
|---|---|---|---|---|
| 5,021,949 A | * | 6/1991 | Morten et al. ............... | 709/231 |
| 5,425,028 A | * | 6/1995 | Britton et al. ............... | 370/289 |
| 5,426,694 A | * | 6/1995 | Hebert ....................... | 379/242 |
| 5,444,703 A | * | 8/1995 | Gagliardi et al. ........... | 370/401 |
| 5,485,460 A | * | 1/1996 | Schrier et al. .............. | 709/227 |
| 5,491,693 A | * | 2/1996 | Britton et al. ............... | 370/401 |
| 5,517,622 A | * | 5/1996 | Ivanoff et al. .............. | 709/232 |
| 5,537,404 A | | 7/1996 | Bentley et al. ............ | 370/60.1 |
| 5,625,678 A | * | 4/1997 | Blomfield-Brown ......... | 379/93 |
| 5,640,394 A | * | 6/1997 | Schrier et al. .............. | 370/389 |
| 5,674,003 A | * | 10/1997 | Andersen et al. ........... | 709/228 |
| 5,708,961 A | * | 1/1998 | Hylton et al. ................. | 725/81 |
| 5,724,355 A | * | 3/1998 | Bruno et al. ................ | 370/401 |
| 5,764,750 A | * | 6/1998 | Chau et al. .................. | 379/229 |
| 5,764,915 A | * | 6/1998 | Heimsoth et al. ........... | 709/227 |
| 5,774,668 A | * | 6/1998 | Choquier et al. ........... | 709/223 |
| 5,793,771 A | * | 8/1998 | Darland et al. ............. | 370/467 |
| 5,793,982 A | * | 8/1998 | Shrader et al. ............. | 709/232 |
| 5,802,053 A | * | 9/1998 | Bollella et al. ............. | 370/401 |
| 5,809,235 A | * | 9/1998 | Sharma et al. .............. | 709/230 |
| 5,826,027 A | * | 10/1998 | Pedersen et al. ............ | 709/221 |
| 5,872,569 A | * | 2/1999 | Salgado et al. ............. | 345/349 |
| 5,915,131 A | * | 6/1999 | Knight et al. .................. | 710/72 |
| 5,938,733 A | * | 8/1999 | Heismsoth et al. ......... | 709/230 |
| 5,951,649 A | * | 9/1999 | Dobbins et al. ............ | 709/238 |
| 6,003,065 A | * | 12/1999 | Yan et al. .................... | 709/201 |

(List continued on next page.)

OTHER PUBLICATIONS

*Transport Provider Interface Specification*, Published by UNIX International, Waterview Corporate Center, 20 Waterview Boulevard, Parsippany, NJ 07054, 1992.

*XPORT Interface Protocol Specification*, Revision 1.0, Mar. 6, 1995 p. 4, an internal document of Hewlett Packard Company, 3000 Hanover St., Palo Alto, CA 94304.

Primary Examiner—Robert B. Harrell
Assistant Examiner—William C. Vaughn, Jr.

(57) ABSTRACT

An input/output device is connected to peripheral equipment. The input/output device includes a plurality of network transport modules. Each network transport module implements a different network protocol. The input/output device includes a communication mechanism for communication with the peripheral equipment. The input/output device also includes a gateway module, which interacts with each of the network transport modules and with the communication mechanism. For each endpoint within an application programming interface (API) module within the peripheral equipment, a corresponding endpoint is implemented within the gateway module. A control channel between the gateway module and the API module is used to transport control messages between the gateway module and the API module. For a network transport module which requires data stream communication, control messages are exchanged over the control channel and data stream communication is established via a separate communication channel between the gateway module and the API module.

31 Claims, 3 Drawing Sheets

U.S. PATENT DOCUMENTS

| | | | |
|---|---|---|---|
| 6,020,973 A | * 2/2000 | Levine et al. | 358/1.15 |
| 6,023,473 A | * 2/2000 | Reine et al. | 370/463 |
| 6,049,531 A | * 4/2000 | Roy | 370/260 |
| 6,049,549 A | * 4/2000 | Ganz et al. | 370/449 |
| 6,055,576 A | * 4/2000 | Beighe | 709/232 |
| 6,085,235 A | * 4/2000 | Clarke, Jr. et al. | 709/219 |

* cited by examiner

NETWORK INTERFACE DEVICE WHICH ALLOWS PERIPHERALS TO UTILIZE NETWORK TRANSPORT SERVICES

BACKGROUND

The present invention concerns networking of peripherals of computing systems and pertains particularly to a network interface device which allows peripherals to utilize network transport services.

Networked systems allow a user working on a computer system to utilize various peripheral equipment distributed at various locations either close to or at a distance from the use. For example the peripheral equipment can include a printer or a scanner or some other type of peripheral equipment which is connected through one or more networks to the computer system.

Various transport protocols can be used by the computing system to communicate with the peripheral equipment. For example, standard protocols such as the Transmission Control Protocol (TCP), the User Datagram Protocol (UDP), Internetwork Packet Exchange (IPX), or Sequenced Packet Exchange (SPX) may be used. Each of these protocols can be referred to as a network transport service To allow peripheral equipment to interact with various network connection services, an interface device is often attached to the peripheral equipment. The interface device provides the peripheral equipment with the ability to communicate using one or more network connection services. Such an interface device is often referred to herein as an input/output (I/O) device or an interface card.

Generally, each network connection service supported by each interface device has required joint definition and implementation in both the interface device and the peripheral equipment. Therefore, every time a new network connection service is added, support for the network connection service must be added into both the interface device and the peripheral equipment. This can require a significant amount of engineering resources.

The Xport Interface Protocol, Version 1 (XIPV1), developed by Hewlett-Packard Company, having a business address of 3000 Hanover Street, Palo Alto, Calif. 94304, has supplied a limited solution to the above described problem. Specifically, XIPV1 supports datagram transport service using the UDP and IPX protocols. However, there is no support for reliable stream transport services, such as the TCP protocol and the SPX protocol. Thus in XIPV1, network connection services require joint definition and implementation in both the interface device and the peripheral equipment.

Another weakness of XIPV1 is that only a single communication channel between the peripheral equipment and the interface device is used. As a result, when the peripheral equipment uses multiple datagram communication endpoints, there is no way to control data flow between the endpoints. Thus communication on one endpoint can monopolize the single channel and "starve" other endpoints.

SUMMARY OF THE INVENTION

In accordance with the preferred embodiment of the present invention, an input/output device is connected to peripheral equipment. For example, the peripheral equipment is a printer or a scanner, and the input/output device is an interface card. The input/output device includes a plurality of network transport modules. Each network transport module implements a different network protocol. The input/output device includes a communication mechanism for communication with the peripheral equipment.

The input/output device also includes a gateway module, which interacts with each of the network transport modules and with the communication mechanism. For each endpoint within the application programming interface (API) module within the peripheral equipment, a corresponding endpoint is implemented within the gateway module. A control channel between the gateway module and the API module is used to transport control messages between the gateway module and the API module. For a network transport module which requires data stream communication, control messages are exchanged over the control channel and data stream communication is established via a separate communication channel between the gateway module and the API module.

In the preferred embodiment, the separate communication channel is initiated by the API module sending a connection request message to the gateway module. The gateway module first responds by returning a connection acknowledgment message to the API module and forwarding the connection request to the local transport service which initiates a connection to a remote host. The gateway module sends a confirmation indication message to the API module upon the gateway module establishing a connection with the remote host.

Also, the separate communication channel can be initiated by the gateway module sending a connection indication message to the API module upon the gateway module receiving a connect request from a remote host. The API module responds by sending an accept request message to the gateway module. The gateway module responds by sending an accept acknowledgment message to the API module.

For example, the separate communication channel is released by the API module sending an end of peripheral data message to the gateway module via the communication channel. The API module also sends an orderly release request to the gateway module via the control channel. The gateway module responds by sending an orderly release acknowledgment message to the API module via the control channel. When the remote host sends an end of connection indication, the gateway module sends an end of host data message to the API module via the communication channel. The gateway module sends an orderly release indication message to the API module via the control channel. The API module sends an end of host data acknowledgment message to the gateway module via the communication channel.

Alternatively, the separate communication channel is released by the gateway module sending an end of host data message to the API module via the communication channel. The gateway module sends an orderly release indication message to the API module via the control channel. When the remote host requests the API module to release the connection, the API module sends an end of peripheral data message to the gateway module via the communication channel after the application requests the API module to release the connections. The API module sends an orderly release request to the gateway module via the control channel. The API module sends an end of host data acknowledgment message to the gateway module via the communication channel. The gateway module responds by sending an orderly release acknowledgment message to the API module via the control channel.

In the preferred embodiment, when the network transport module becomes disabled, the separate communication channel is released by the gateway module sending an end of host data message to the API module via the communication channel. The gateway module sends a new state indication message to the API module via the control channel. The API module sends an end of host data acknowledgment message to the gateway module via the communication channel. The API module sends a new state response message to the gateway module via the communication channel. The gateway module signals that the transport module is enabled by sending a new state indication message to the API module via the control channel. The API module responds by sending a new state response message to the gateway module via the communication channel.

In the preferred embodiment, a local protocol address is bound to a previously opened endpoint by the API module sending a bind request message to the gateway module. The bind request message includes a bind sequence number. The gateway module sends a bind acknowledge message to the API module.

Also in the preferred embodiment, the API module obtains system parameters of the input/output device by sending a system information request message to the gateway module. The gateway module sends a system information acknowledgment message to the API module. The system information acknowledgment message includes information on the parameters of the input/output device.

The present invention allows peripheral equipment to add network services without affecting the network interface device (I/O device). The new network services can utilize both datagram and stream network transports. Each connection to a remote host utilizes a separate communication channel so that the peripheral equipment can control data flow on an individual connection basis.

DESCRIPTION OF THE PRIOR ART

Figure 1:
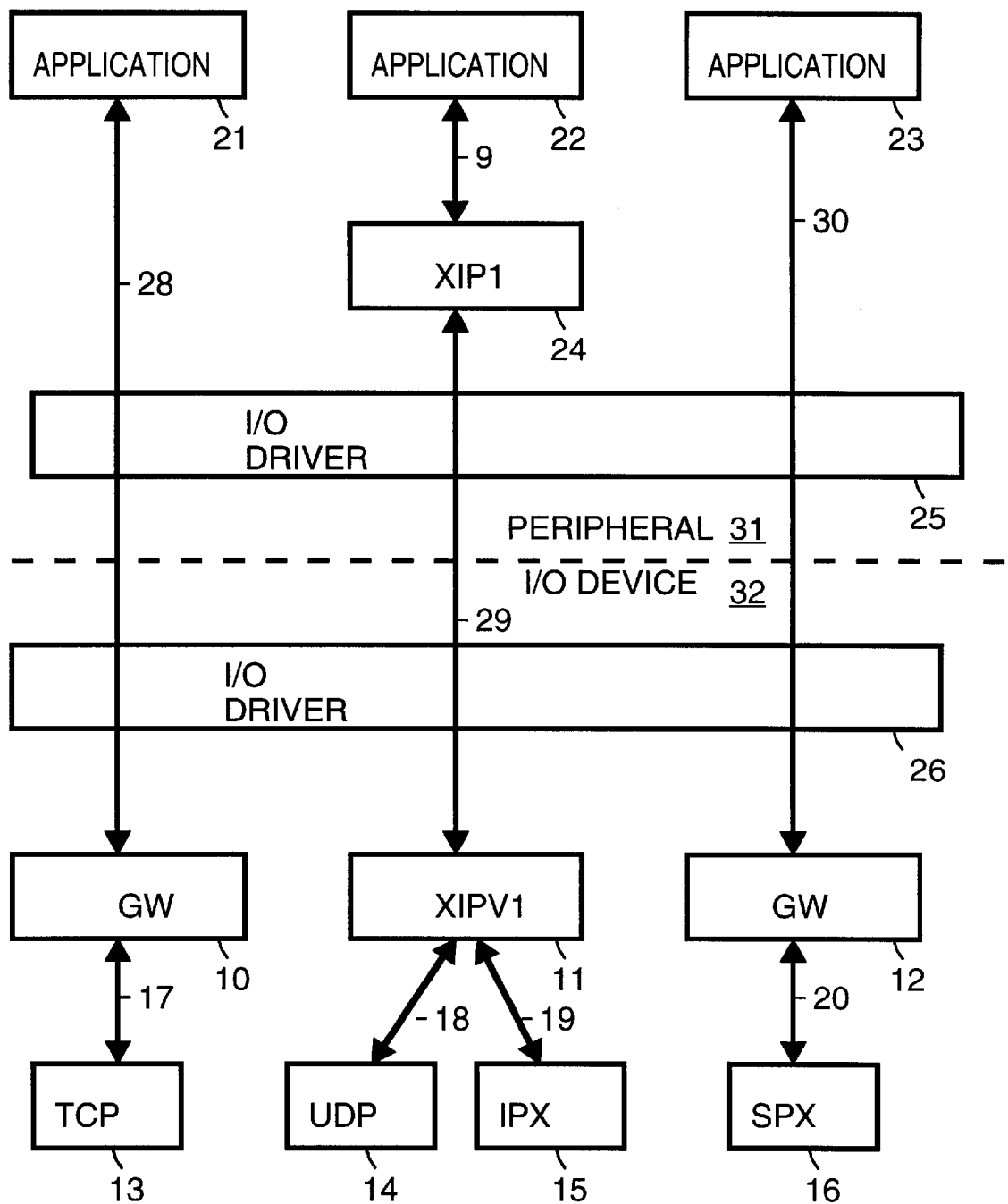
FIG. 1 is a block diagram which shows connection of an interface device and peripheral equipment in accordance with the prior art.

FIG. 1 is a simplified diagram which shows peripheral equipment 31 connected to an interface device 32. An input/output (I/O) driver 26 within the interface device 32 is used to communicate with I/O driver 25 of peripheral equipment 31 and to communicate with network transport services. A gateway (GW) 10 is used to communicate over a channel 17 to a network transport module 13 which utilizes the TCP protocol. A gateway (GW) 12 is used to communicate over a channel 20 to a network transport module 16 which utilizes the SPX protocol. An XIPV1 module 11 is used to communicate over a channel 18 to a network transport module 14 which utilizes the UPX protocol. XIPV1 module 11 is also used to communicate over a channel 19 to a network transport module 15 which utilizes the IPX protocol.

An application 21 within peripheral equipment 31 communicates to gateway 10 through a communication channel 28. An application 23 within peripheral equipment 21 communicates to gateway 12 through a communication channel 30. An XIPV1 module 24 communicates with XIPV1 module 11 through a communication channel 29. Application 22 communicates with XIPV1 module 22 through a channel 9. FIG. 1 is just one example. Other peripherals may have a different arrangement of applications and transports.

Implementation of channel 28 between application 21 and gateway 10 requires joint definition and implementation in both interface device 32 and peripheral equipment 31. Also, implementation of channel 30 between application 23 and gateway 12 requires joint definition and implementation in both interface device 32 and peripheral equipment 31. Therefore, every time such a new network application is added, support for the network transport service must be added into both interface device 32 and peripheral equipment 31. This can require a significant amount of engineering resources.

XIPV1 module 11 and XIPV1 module 24 support datagram transport service using the UDP and IPX protocols. However, there is no support for reliable stream transport services, such as the TCP protocol and the SPX protocol. Additionally, XIPV1 module 11 and XIPV1 module 24 communicate through only a single communication channel 29 between peripheral equipment 31 and interface device 32. As a result, when peripheral equipment 31 uses multiple datagram communication endpoints, there is no way to control data flow between the endpoints. Thus communication on one endpoint can monopolize communication channel 29 and "starve" other endpoints.

DESCRIPTION OF THE PREFERRED EMBODIMENT

Figure 2:
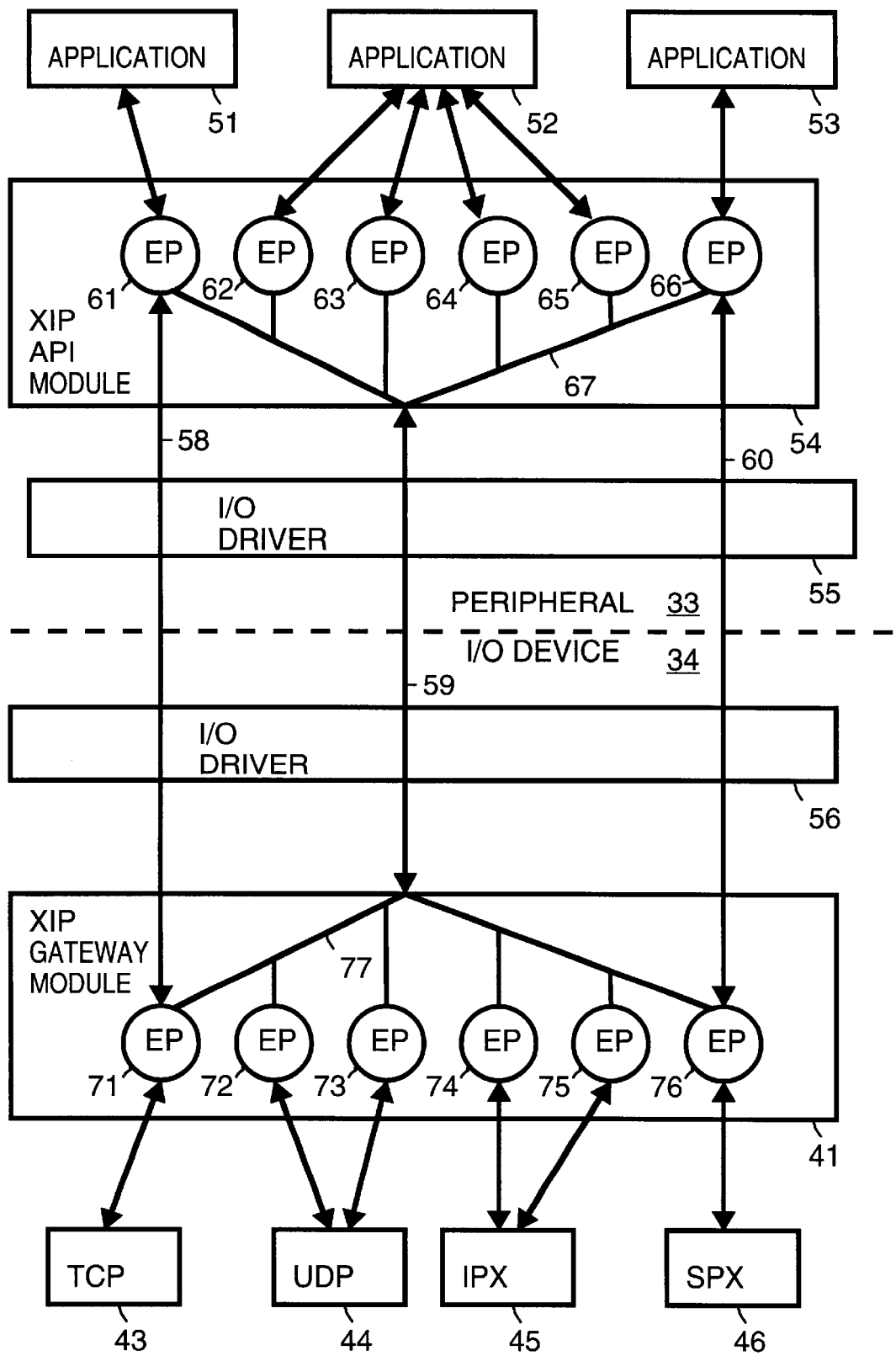
FIG. 2 is a block diagram which shows connection of an I/O device and peripheral equipment in accordance with the preferred embodiment of the present invention.

FIG. 2 is a simplified diagram which shows peripheral equipment 33 connected to an input/output (I/O) device 34. The interface between peripheral equipment 33 and I/O device 34 utilizes the Xport Interface Protocol, Version 2 (XIP) protocol, in accordance with the preferred embodiment of the present invention.

For example, peripheral equipment 33 is a scanner or a printer. Interface device 34 is, for example, an interface card which plugs into peripheral equipment 33.

An input/output (I/O) driver 56 within I/O device 34 is used to communicate with I/O driver 55 of peripheral equipment 33 and to communicate with network connection services through a XIP gateway module 41. Zero, one or more endpoints within XIP gateway module 41 are used to communicate with a network transport module 43 which utilizes the TCP protocol. Zero, one or more endpoints within XIP gateway module 41 are also used to communicate with a network transport module 46 which utilizes the SPX protocol. Zero, one or more endpoints within XIP gateway module 41 are used to communicate with a network transport module 44 which utilizes the UDP protocol. Zero, one or more endpoints within XIP gateway module 41 are also used to communicate with a network transport module 45 which utilizes the IPX protocol.

An application 51, an application 52 and an application 53 within peripheral equipment 33 each communicates with one or more endpoints within an XIP application programming interface (API) module 54.

Each endpoint within XIP API module 54 is logically connected to a endpoint within XIP gateway module 41. An endpoint (EP) 61 within XIP API module 54 is logically connected to an endpoint 71 within XIP gateway module 41. An endpoint (EP) 62 within XIP API module 54 is logically connected to an endpoint 72 within XIP gateway module 41.

An endpoint (EP) 63 within XIP API module 54 is logically connected to an endpoint 73 within XIP gateway module 41. An endpoint (EP) 64 within XIP API module 54 is logically connected to an endpoint 74 within XIP gateway module 41. An endpoint (EP) 65 within XIP API module 54 is logically connected to an endpoint 75 within XIP gateway module 41. An endpoint (EP) 66 within XIP API module 54 is logically connected to an endpoint 76 within XIP gateway module 41. And so on for any additional endpoints.

A channel 59 between XIP API module 54 and XIP gateway module 41 is used as an XIP control channel which communicates control information between endpoints in XIP API module 54 and endpoints in XIP gateway module 41. An XIP data channel 58 is used as a stream transport connection between endpoint 61 and an endpoint 71 allowing for implementation of the TCP protocol within peripheral equipment 33 without joint definition and implementation in both I/O device 34 and peripheral equipment 33. An XIP data channel 60 is used as a stream transport connection between endpoint 66 and an endpoint 76 allowing for implementation of the SPX protocol within peripheral equipment 33 without joint definition and implementation in both I/O device 34 and peripheral equipment 33.

XIP API module 54 acts as an application programming interface (API). XIP API module 54 carries out network transport service requests from applications 51, 52 and 53. Some requests are executed by accessing local data structures of XIP API module 54. However, most requests cause XIP API module 54 to construct an XIP message and transmit the constructed message to I/O device 34. I/O driver 55 and I/O driver 56 act as a communication mechanism between peripheral equipment 33 and I/O device 34. For example, I/O driver 55 may communicate with I/O driver 56 using the IIO protocol. Alternatively another protocol such as Multiple Logical Channels (MLC) protocol, the Modular Input/Output (MIO) protocol, the IEEE 1394 protocol, the IEEE 1284 protocol or the IEEE 1284.4 protocol or some other protocol may be used.

XIP gateway module 41 is an XIP gateway. XIP gateway module 41 receives messages from XIP API module 54 and acts upon the messages. Some requests are executed by accessing local data structures within XIP gateway module 41. Other messages cause XIP gateway module 41 to issue a request to a network transport module.

Network I/O device 34 may support multiple peripherals. In this case, each peripheral shares a common network layer (IP) address along with network I/O device 34. If all the peripherals want to offer the same network service, each needs a unique transport layer service access point (TSAP) or address. This is solved by providing an XIP message by which the peripheral requests the device port number it is connected to and the interface device answers. The network application on the peripheral can use this information to generate a unique transport address.

The present invention allows use of a dedicated communication channel for each endpoint. Stream endpoints use a dedicated channel for each connection. In FIG. 2, this is illustrated by channel 58 and channel 60. Network data travels on the dedicated channels and XIP control messages travel on the XIP control channel 59. This allows peripheral equipment 33 to handle data more efficiently. The data and control channels between XIP API module 54 and XIP gateway module 41 are kept synchronized. Without synchronization, XIP API module 54 and XIP gateway module 41 could allow message on one channel to "pass up" messages on another channel. Thus, a request to close a connection, or open a new one, could be processed by XIP gateway module 41 before all data for the connection has been received. This occurs for example, during a connection shutdown, during a datagram endpoint rebind (change of TSAP), and during a network interface device reset. Details of how synchronization is maintained are set out below.

Figure 3:
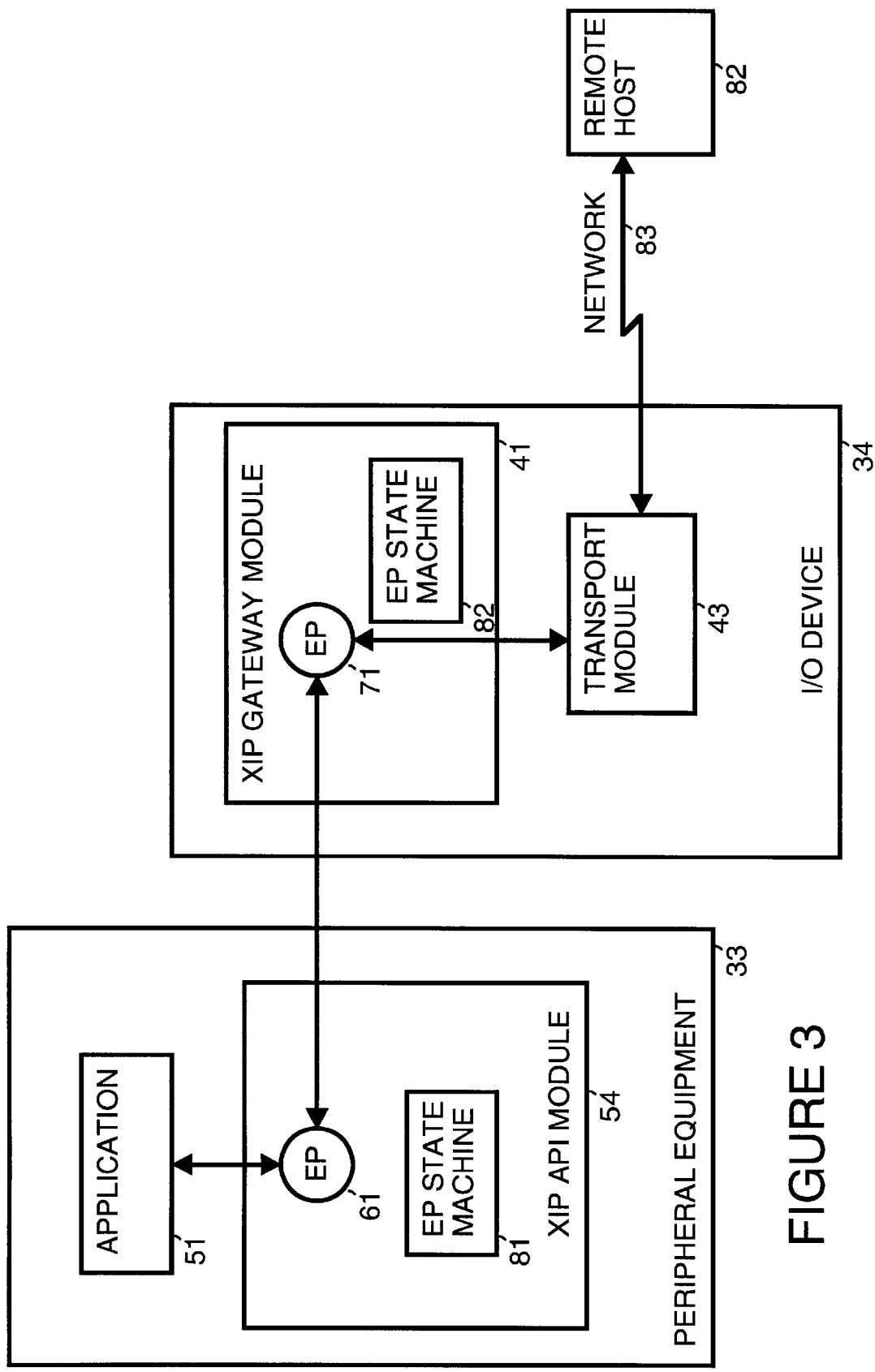
FIG. 3 is a block diagram which shows a remote host connected through an I/O device to peripheral equipment in accordance with the preferred embodiment of the present invention.

FIG. 3 shows a data path from a remote host 82 to application 51. Each endpoint is controlled by an endpoint state machine. Endpoint state machine 81 controls endpoint 61 in XIP API module 54. Endpoint state machine 82 controls endpoint 71 in gateway module 41. Remote host 82 communicates with transport module 43 within I/O device 34 via a network 83.

XIP API module 54 and XIP gateway module 41 communicate by exchanging messages as defined below.

Each message name includes a suffix indicating what it does. The peripheral sends messages with _REQ (request), _RES (response), and _OUT (data) suffixes. The I/O device sends messages with _ACK (acknowledge), _IND (indication), and IN (data) suffixes.

The message structures are shown using C-like syntax. Unfortunately, they are not actually compilable because C has no way to describe the variable length arrays at the end of many messages.

Every message starts with the same four fields. Some messages don't use every field, but they are included anyway because a common header makes implementation easier. All multi-byte integers are in network byte order or "big-endian format"(most significant byte (MSB) first). Table 1 below sets out the generic structure.

TABLE 1

```
struct x_generic_msg {
    uint8 command;
    uint8 result;
    uint16 reserved;
    uint32 p_endpoint;      /* peripheral endpoint number */
    uint32 d_endpoint;      /* I/O device endpoint number */
};
```

| | |
|---|---|
| command | Identifies the message type. |
| result | Result of the operation. This field is only meaningful in replies. |
| reserved | This field is currently unused, but is reserved for future use. It also aligns the following field on a 32 bit boundary. |
| p_endpoint | The peripheral endpoint number the message is related to. |
| d_endpoint | The I/O device endpoint number the message is related to. |

Table 2 below sets out the format for the x_accept_ack message. This message acknowledges an x_accept_req on the listening endpoint.

TABLE 2

```
struct x_accept_ack {
    uint8 command;        /* X_ACCEPT_ACK */
    uint8 result;
    uint16 reserved;
    uint32 p_endpoint;    /* peripheral endpoint number */
    uint32 d_endpoint;    /* I/O device endpoint number */
    uint32 conn_seq;      /* pending connection seq num */
};
```

| | |
|---|---|
| command | X_ACCEPT_ACK |
| result | Result of the operation. Possible errors: TBADF Unknown endpoint number. TOUTSTATE Request not legal in |

TABLE 2-continued

|   |   |   |
|---|---|---|
| | | current state. |
| | | TNOTSUPPORT Transport does not support this request. |
| | | TBADSEQ Unknown sequence number. |
| | | TRESADDR Accepting endpoint bound to different address. |
| | | TINDOUT Endpoint has outstanding connect indications. |
| | | TRESQLEN Accepting endpoint can't have qlen > 0. |
| | | TPROVMISMATCH Accepting endpoint uses different transport. |
| | | TSYSERR System error. |
| | | TPROTO Other XIP protocol error. |
| | $p_{13}$ endpoint | Peripheral endpoint number. This is the endpoint the xconnind arrived on, not the endpoint the connection was actually accepted on. |
| | d_endpoint | Device endpoint which sent this message. |
| conn_seq | | Same sequence number provided by XIP API module 54 in the request. |

Table 3 below sets out the format for the x_accept_req message. This message accepts a pending connect request indicated earlier by an x_conn_ind message.

TABLE 3

```
struct x_accept_req {
        uint8 command;          /* X_ACCEPT_REQ */
        uint8 result;           /* meaningless */
        uint16 reserved;
        uint32 p_endpoint;      /* peripheral endpoint number */
        uint32 d_endpoint;      /* I/O device endpoint number */
        uint32 conn_seq;        /* pending connection seq num */
        uint32 acc_endpoint;    /* I/O device endpoint number */
};
```

| | |
|---|---|
| command | X_ACCEPT_REQ |
| result | Meaningless in this message. |
| p_endpoint | Peripheral endpoint which sent this message. |
| d_endpoint | Device endpoint which sent the xconnind message. |
| conn_seq | Sequence number of the connect request. The same number provided in the x_conn_ind which XIP API module 54 is accepting. |
| acc_endpoint | Device endpoint on which to accept the connection. This can either be the same endpoint the connect request arrived on or a different one. If it is the same, the endpoint will not be able to listen for any new connections as long as it is connected. If it is different, the new endpoint must have been created already with an x_open_req message. The new endpoint may be bound to an address already or it may be unbound. If unbound, XIP gateway module 41 will copy the address from the listening endpoint. |

Table 4 below sets out the format for the x_bind_ack message. This message acknowledges an x_bind_req. It provides the full local address actually bound. It also provides the negotiated connect indication queue length.

TABLE 4

```
struct x_bind_ack {
        uint8 command;               /* X_BIND_ACK */
        uint8 result;
        uint16 reserved;
        uint32 p_endpoint;           /* peripheral endpoint number */
        uint32 d_endpoint;           /* I/O device endpoint number */
        uint32 bind_seq;
        uint32 queue_len;
        uint32 addr_len
        uint8 address [addr_len];    /* variable length */
};
```

| | |
|---|---|
| command | X_BIND_ACK |
| result | Result of the operation. Possible errors: |
| | TBADF Unknown endpoint number. |
| | TOUTSTATE Request not legal in current state. |
| | TBADADDR Incorrect address. |
| | TNOADDR Unable to allocate address. |
| | TADDRBUSY Address already in use. |
| | TSYSERR System error. |
| | TPROTO Other XIP protocol error. |
| p_endpoint | Peripheral endpoint number. |
| d_endpoint | Device endpoint which sent this message. |
| bind_seq | Same bind sequence number specified by peripheral in the x_bind_req message. |
| queue_len | The number of outstanding connect indications the transport module will queue. This number will be less than or equal to the length requested in the x_bind_req message. It will always be at least one if the bind message requested a non-zero queue length. See that message for more information about connect queuing. |
| addr_len | Size in bytes of the local address that follows. |
| address | The local protocol address actually bound to the endpoint. |

Table 5 below sets out the format for the x_bind_req message. This message binds a local protocol address to a previously opened endpoint. For stream channels, it also specifies how many connect requests XIP API module 54 would like XIP gateway module 41 to queue on this endpoint.

The connect request queue holds pending connections until XIP API module 54 has a chance to respond to them. The length of this queue does not determine the maximum number of simultaneous connections the transport module will support. It just determines the maximum burst size before XIP gateway module 41 drops additional connect requests. If the queue length is zero, the endpoint will not listen for connect requests.

XIP gateway module 41 may select a smaller queue length, but not a larger one. However, if XIP API module 54 asked for a queue length greater than zero, XIP gateway module 41 must select a length of at least one.

If the underlying transport provider allows it, any number of endpoints may share the same local address. However, only one of them may have a queue length greater than zero.

TABLE 5

```
struct x_bind_req {
    uint8 command;          /* X_BIND_REQ */
    uint8 result;           /* meaningless */
    uint16 reserved;
    uint32 p_endpoint;      /* peripheral endpoint number */
    uint32 d_endpoint;      /* I/O device endpoint number */
    uint32 bind_seq;
    uint32 queue_len;
    uint32 addr_len;
    uint8 address[addr_len]; /* variable length */
};
```

| | |
|---|---|
| command | x_BIND_REQ |
| result | Meaningless in this message. |
| p_endpoint | Peripheral endpoint which sent this message. |
| d_endpoint | Device endpoint the address is to be bound to. |
| bind_seq | Bind sequence number. XIP API module 54 must choose a unique number for every bind request on a datagram endpoint. Every x_unitdata_in and x_unitdata_out for this address will carry the same number. This avoids stale datagrams after a rebind. |
| queue_len | Requested connect request queue length. See below for details. This field is ignored by connectionless transports. |
| addr_len | Size in bytes of the local address that follows. The length may be zero to request that the transport module assign a unique local address. |
| address | Local address to bind to the endpoint. The address is in the format the endpoint's transport expects. |

Table 6 below sets out the format for the x_close_ack message. This message acknowledges an x_close_req message.

TABLE 6

```
struct x_close_ack {
    uint8 command;          /* X_CLOSE_ACK */
    uint8 result;
    uint16 reserved;
    uint32 p_endpoint;      /* peripheral endpoint number */
    uint32 d_endpoint;      /* I/O device endpoint number */
};
```

| | |
|---|---|
| command | X_CLOSE_ACK |
| result | Result of the operation. Possible errors:<br>TBADF Unknown endpoint number.<br>TSYSERR System error.<br>TPROTO Other XIP protocol error. |
| p_endpoint | Peripheral endpoint number. |
| d_endpoint | Device endpoint which sent this message. |

Table 7 below sets out the format for the x_close_req message. This message closes a transport endpoint. The endpoint ceases to exist. Any dedicated channel associated with the endpoint is also freed.

TABLE 7

```
struct x_close_req {
    uint8 command;          /* X_CLOSE_REQ */
    uint8 result;           /* meaningless */
    uint16 reserved;
```

TABLE 7-continued

```
    uint32 p_endpoint;      /* peripheral endpoint number */
    uint32 d_endpoint;      /* I/O device endpoint number */
};
```

| | |
|---|---|
| command | X_CLOSE_REQ |
| result | Meaningless in this message. |
| p_endpoint | Peripheral endpoint which sent this message. |
| d_endpoint | Device endpoint to close. |

Table 8 below sets out the format for the x_conf_ind message. This message confirms that a pending connection is complete. It is the final response to an x_conn_req message. It also provides the actual remote address connected to.

TABLE 8

```
struct x_conf_ind {
    uint8 command;          /* X_CONF_IND */
    uint8 result;           /* meaningless */
    uint16 reserved;
    uint32 p_endpoint;      /* peripheral endpoint number */
    uint32 d_endpoint;      /* I/O device endpoint number */
    uint32 addr_len
    uint8 address[addr_len]; /* variable length */
};
```

| | |
|---|---|
| command | X_CONF_IND |
| result | Meaningless in this message. |
| p_endpoint | Peripheral endpoint number. |
| d_endpoint | Device endpoint which sent this message. |
| addr_len | Size in bytes of the address that follows. |
| address | Address of remote host 82 responding to the connection. |

Table 9 below sets out the format for the x_conn_ack message. This message acknowledges an x_conn_req message. The connection is not actually up at this point. The transport provider will send an x_conf_ind message later to confirm the connection.

TABLE 9

```
struct x_conn_ack {
    uint8 command;          /* X_CONN_ACK */
    uint8 result;
    uint16 reserved;
    uint32 p_endpoint;      /* peripheral endpoint number */
    uint32 d_endpoint;      /* I/O device endpoint number */
};
```

| | |
|---|---|
| command | X_CONN_ACK |
| result | Result of the operation. Possible errors:<br>TBADF Unknown endpoint number.<br>TOUTSTATE Request not legal in current state.<br>TNOTSUPPORT Transport does not support this request.<br>TBADADDR Incorrect address.<br>TADDRBUSY Connection already exists between same local and remote address pair.<br>TSYSERR System error.<br>TPROTO Other XIP protocol error. |
| p_endpoint | Peripheral endpoint number. |
| d_endpoint | Device endpoint which sent this message. |

Table 10 below sets out the format for the x_conn_ind message. This message indicates an incoming connect request from a remote host. It can only happen on an endpoint with a connect queue length greater than zero that is not currently connected.

TABLE 10

```
struct x_conn_ind {
        uint8 command;              /* X_CONN_IND */
        uint8 result;               /* meaningless */
        uint16 reserved;
        uint32 p_endpoint;          /* peripheral endpoint number */
        uint32 d_endpoint;          /* I/O device endpoint number */
        uint32 conn_seq;            /* pending connection seq num */
        uint32 addr_len;
        uint8 address[addr_len];    /* variable length */
};
```

| | |
|---|---|
| command | X_CONN_IND |
| result | Meaningless in this message. |
| p_endpoint | Peripheral endpoint number. |
| d_endpoint | Device endpoint which sent this message. |
| conn_seq | Sequence number of the connect request. Used with multiple connects to indicate which one XIP API module 54 is responding to. XIP gateway module 41 may use any numbering scheme, except that 0XFFFFFFFF is not a valid sequence number. |
| addr_len | Size in bytes of the address that follows. |
| address | Address of the host requesting the connection. |

Table 11 below sets out the format for the x_conn_req message. This message initiates an active connection to the specified remote address.

TABLE 11

```
struct x_conn_req {
        uint8 command;              /* X_CONN_REQ */
        uint8 result;               /* meaningless */
        uint16 reserved;
        uint32 p_endpoint;          /* peripheral endpoint number */
        uint32 d_endpoint;          /* I/O device endpoint number */
        uint32 addr_len;
        uint8 address[addr_len];    /* variable length */
};
```

| | |
|---|---|
| command | X_CONN_REQ |
| result | Meaningless in this message. |
| p_endpoint | Peripheral endpoint which sent this message. |
| d_endpoint | Device endpoint to connect. |
| addr_len | Size in bytes of the address that follows. |
| address | Remote address XIP API module 54 wants to connect to |

Table 12 below sets out the format for the x_discon_ack message. This message acknowledges an x_discon_req message. If the endpoint was in DATAXFER, INREL, or OUTREL state, XIP gateway module 41 also sends an EOHD flag on the dedicated stream channel. XIP API module 54 flushes all data until it receives the EOHD with the same number as in this message.

TABLE 12

```
struct x_discon_ack {
        uint8 command;              /* X_DISCON_ACK */
        uint8 result;
        uint16 reserved;
        uint32 p_endpoint;          /* peripheral endpoint number */
        uint32 d_endpoint;          /* I/O device endpoint number */
        uint32 conn_seq;            /* pending connection seq num */
        uint32 sync_num;            /* channel EOHD marker seq num */
};
```

TABLE 12-continued

| | |
|---|---|
| command | X_DISCON_ACK |
| result | Result of the operation. Possible errors: TBADF Unknown endpoint number. TOUTSTATE Request not legal in current state. TNOTSUPPORT Transport does not support this request. TBADSEQ Unknown sequence number. TSYSERR System error. TPROTO Other XIP protocol error. |
| p_endpoint | Peripheral endpoint number. |
| d_endpoint | Device endpoint which sent this message. |
| conn_seq | Same sequence number provided by XIP API module 54 in the request. |
| sync_num | Most recent end-of-host-data sequence number sent on dedicated channel. |

Table 13 below sets out the format for the x_discon_ind message. This message indicates that a connection is down. XIP API module 54 does not need to respond to this message; just clean up after the lost connection.

The x_discon_ind message has three uses. The first use is to indicate that an existing connection was aborted. This is a hard disconnect. I/O device 34 will not accept any more data from peripheral equipment 33 or the remote end. However, there may be data in the channel between XIP gateway module 41 and XIP API module 54. I/O device 34 will drop any outbound data without sending it. XIP API module 54 will drop any inbound data without delivering it to the user.

The second use of the x_discon_ind message is to indicate that a pending x_conn_req was denied by remote host 82.

The third use of the x_discon_ind message is to indicate that a remote host requested a connection and then closed the connection before the local user had a chance to accept it. In this case the sequence number indicates which pending connection is closed.

If the endpoint was in DATAXFER, INREL, or OUTREL state, XIP gateway module 41 also sends an EOHD flag on the dedicated stream channel. XIP API module 54 flushes all data until it receives the EOHD with the same number as in this message.

TABLE 13

```
struct x_discon_ind {
        uint8 command;              /* X_DISCON_IND */
        uint8 result;               /* meaningless */
        uint16 reserved;
        uint32 p_endpoint;          /* peripheral endpoint number */
        uint32 d_endpoint;          /* I/O device endpoint number */
        uint32 conn_seq;            /* pending connection seq num */
        uint32 sync_num;            /* channel EOHD marker seq num */
        uint32 reason;              /* disconnect reason code */
};
```

| | |
|---|---|
| command | X_DISCON_IND |
| result | Meaningless in this message. |
| p_endpoint | Peripheral endpoint number. |
| d_endpoint | Device endpoint which sent this message. |
| conn_seq | Indicates that an incoming connection was disconnected before it was fully established. This is the |

TABLE 13-continued

| | |
|---|---|
| | same sequence number from the x_conn_ind message. If the connection was fully established, or was initiated by an x_conn_req message, this value is 0XFFFFFFFF. |
| sync_num | Most recent end-of-host-data sequence number sent on dedicated channel. |
| reason | Transport specific disconnect reason code. The ERS document for each XIP implementation documents what reason codes it uses. |

Table 14 below sets out the format for the x_discon_req message. This message has three uses. The second use of the x_discon_req message is to abort an open connection. This is a hard disconnect. The transport provider will not accept any more data from the remote end. However, there may be data in the pipe between the transport provider and XIP API module 54. The transport provider will drop any outbound data without sending it. XIP API module 54 will drop any inbound data without delivering it to the user.

The second use of the x_discon_req message is to abort a pending active connect requested earlier by an x_conn_req message.

The third use of the x_discon_req message is to reject a pending passive connect request indicated earlier by an x_conn_ind message.

TABLE 14

```
struct x_discon_req {
        uint8 command;        /* X_DISCON_REQ */
        uint8 result;         /* meaningless */
        uint16 reserved;
        uint32 p_endpoint;    /* peripheral endpoint number */
        uint32 d_endpoint;    /* I/O device endpoint number */
        uint32 conn_seq;      /* pending connection seq num */
};
```

| | |
|---|---|
| command | X_DISCON_REQ |
| result | Meaningless in this message. |
| p_endpoint | Peripheral endpoint which sent this message. |
| d_endpoint | Device endpoint to disconnect. |
| conn_seq | Used to reject a pending connect request. This is the same sequence number from the x_conn_ind message. Ignored for active connects and established connections. |

Table 15 below sets out the format for the x_ep inf_ack message. This message returns the protocol parameters requested by an x_ep_info_req message.

TABLE 15

```
struct x_ep_info_ack {
        uint8 command;        /* X_EP_INFO_ACK */
        uint8 result;
        uint/6 reserved;
        uint32 p_endpoint;    /* peripheral endpoint number */
        uint32 d_endpoint;    /* I/O device endpoint number */
        sint32 tsdu_size;     /* Max TSDU size */
        sint32 etsdu_size;    /* Max ETSDU size */
        sint32 cdata_size;    /* Connect data size */
        sint32 ddata_size;    /* Disconnect data size */
        sint32 addr_size;     /* TSAP size */
        sint32 opt_size;      /* Options size */
        sint32 tidu_size;     /* TIDU size */
        sint32 serv_type;     /* Service type */
        sint32 current_state; /* Endpoint state */
        sint32 provider_flag; /* Provider flags */
        sint32 addr_fr_family;/* Address family */
};
```

| | |
|---|---|
| command | X_EP_INFO_ACK |
| result | Result of the operation. Possible errors: TBADF Unknown endpoint number. TSYSERR System error. TPROTO Other XIP protocol error. |
| p_endpoint | Peripheral endpoint number. |
| d_endpoint | Device endpoint which sent this message. |
| tsdu_size | Maximum Transport Service Data Unit. 0 means the transport module does not support the concept of TSDU, although it does support a data stream with no logical boundaries. −1 means there is no limit on the TSDU size. −2 means the transport module provider does not support normal data. |
| etsdu_size | Maximum Expedited Transport Service Data Unit. 0 means the transport provider does not support the concept of ETSDU, although it does support an expedited data stream with no logical boundaries. −1 means there is no limit on the ETSDU size. −2 means the transport provider does not support expedited data. |
| cdata_size | Maximum connection establishment data. −2 means the transport provider does not support sending data with connection establishment primitives. |
| ddata_size | Maximum disconnect data. −2 means the transport provider does not support sending data with disconnect primitives. |
| addr_size | Maximum protocol address size. −2 means the transport provider does not provide access to protocol addresses. |
| opt_size | Maximum number of bytes of protocol-specific options. −2 means the transport provider supports reading options, but not setting them. −3 means the transport provider does not support any options. |
| tidu_size | Maximum Transport Interface Data Unit. |
| serv_type | Service type supported by the transport provider. COTS Connection oriented with no orderly release support. COTS_ORD Connection oriented with orderly release support. CLTS Connectionless (datagram) service. |
| current_state | The current state of the endpoint. |
| provider_flag | Additional transport-specific flags. None supported in this version. |
| addr_family | Address family code for this transport provider. |

Table 16 below sets out the format for the x_ep_info_req message. This message retrieves transport provider parameters. It may be issued at any time and has no effect on the endpoint.

TABLE 16

```
struct x_ep_info_req {
    uint8 command;        /* X_EP_INFO_REQ */
    uint8 result;         /* meaningless */
    uint16 reserved;
    uint32 p_endpoint;    /* peripheral endpoint number */
    uint32 d_endpoint;    /* I/O device endpoint number */
};
```

| | |
|---|---|
| command | X_EP_INFO_REQ |
| result | Meaningless in this message. |
| p_endpoint | Peripheral endpoint which sent this message. |
| d_endpoint | Device endpoint the peripheral wants information about. |

Table 17 below sets out the format for the x_new_state_ind message. This is the first XIP message sent. XIP gateway module 41 sends an x_new_state_ind message shortly after boot to notify peripheral equipment 33 that I/O device 34 supports XIP, to provide the XIP version number that I/O device 34 supports, and to provide the state of each transport number that I/O device 34 supports.

XIP gateway module 41 also sends an x_new_state_ind whenever any transport is enabled or disabled. This happens when I/O device 34 is first powered up, when I/O device 34 is reset, when a protocol stack is enabled or disabled via the front panel, when a protocol stack is enabled or disabled via SNMP, before an I/O device firmware download, after an I/O device firmware download or when there is a network address change in the I/O device 34.

An external I/O device also sends an x_new_state_ind when a new MLC peripheral becomes available. This happens when peripheral equipment 33 is first powered up, when peripheral equipment 33 comes back up after a power cycle, and when the parallel cable is connected or reconnected.

The x_new_state_ind message always provides the state of every transport. Whenever XIP API module 54 receives a message showing that a transport is down, XIP API module 54 assumes all endpoints using that transport are now closed and clean up their resources. XIP API module 54 does not send x_close_req messages for the endpoints. XIP gateway module 41 must automatically close and clean up all endpoints whenever a transport becomes disabled or when the communication link to peripheral equipment 33 is cut off.

If the network address for I/O device 34 changes, XIP gateway module 41 must tell XIP API module 54 that the transport module is down so that all endpoints are closed. XIP gateway module 41 may then immediately tell XIP API module 54 that the transport module is back up. If XIP API module 54 keeps a copy of the network address of I/O device 34, XIP API module 54 reloads the network address after every x_new_state_ind.

TABLE 17

```
struct x_new_state_ind {
    uint8 command;         /* X_NEW_STATE_IND */
    uint8 result;          /* meaningless */
    uint16 reserved;
    uint32 p_endpoint;     /* meaningless */
```

TABLE 17-continued

```
    uint32 d_endpoint;     /* meaningless */
    uint32 version;
    uint32 sync_num;       /* channel EOHD marker seq
    uint32 num_elements;   num */
    struct {
        uint32 transport;
        uint32 enabled;
    } transport_list[num_elements];
};
```

| | |
|---|---|
| command | X_NEW_STATE_IND |
| result | Meaningless in this message. |
| p_endpoint | Meaningless in this message. |
| d_endpoint | Meaningless in this message. |
| version | XIP version number. Always 0x0201 for I/O devices that support this specification. |
| sync_num | End-of-host-data inbound sequence number on all dedicated channels affected by this message. |
| num_elements | The number of (transport, state) pairs in the following table. |
| transport | One of the transport numbers supported by I/O device 34. |
| enabled | Flag indicating whether the transport module is enabled. |

Table 18 below sets out the format for the x_new_state_res message. XIP API module 54 sends this message to acknowledge the x_new_state_ind. It also provides the XIP version number that XIP API module 54 supports.

XIP API module 54 returns the same transport list provided in the x_new_state_ind message.

TABLE 18

```
struct x_new_state_res {
    uint8 command;         /* X_NEW_STATE_RES */
    uint8 result;          /* meaningless */
    uint16 reserved;
    uint32 p_endpoint;     /* meaningless */
    uint32 d_endpoint;     /* meaningless */
    uint32 version;
    uint32 sync_num;       /* channel EOHD marker seq
    uint32 num_elements;   num */
    struct {
        uint32 transport;
        uint32 enabled;
    } transport_list[num_elements];
};
```

| | |
|---|---|
| command | X_NEW_STATE_RES |
| result | Meaningless in this message. |
| p_endpoint | Meaningless in this message. |
| d_endpoint | Meaningless in this message. |
| version | XIP version number. Always 0x0200 for peripherals that support this specification. |
| sync_num | End-of-host-data inbound sequence number on all dedicated channels affected by this message. |
| num_elements | The number of (transport, state) pairs in the following table. |
| transport | Copy of the transport list sent in the x_new_state_ind. |
| enabled | Copy of the transport list sent in the x_new_state_ind. |

Table 19 below sets out the format for the x_open_ack message. This message acknowledges an x_open_req message and, optionally, provides the backplane channel for data transfer on this endpoint.

TABLE 19

```
struct x_open_ack {
        uint8 command;            /* X_OPEN_ACK */
        uint8 result;
        uint16 reserved;
        uint32 p_endpoint;        /* peripheral endpoint number */
        uint32 d_endpoint;        /* I/O device endpoint number */
        uint32 transport;
        uint32 chan_len;
        uint8 channel[chan_len];  /* variable length */
};
```

| | |
|---|---|
| command | X_OPEN_ACK |
| result | Result of the operation. Possible errors:<br>TBADF Unable to create new endpoint.<br>TBADNAME Unknown transport number.<br>TBADCHAN Channel number unknown or unavailable.<br>TTPDOWN Transport is down.<br>TSYSERR System error.<br>TPROTO Other XIP protocol error. |
| p_endpoint | Peripheral endpoint number. |
| d_endpoint | Device endpoint number. XIP API module 54 will use this number to send all future messages for this endpoint. |
| transport | Same transport number as in request. |
| chan_len | Size in bytes of the channel information that follows. Will be zero if XIP gateway module 41 does not support separate channels or XIP API module 54 did not request one for this endpoint. |
| channel | Channel which XIP gateway module 41 will use for data transfer. The exact meaning of the channel field is specific to the communication method between peripheral equipment 33 and I/O device 34. For I/O, this field will be the 16 bit IOChannel number selected by the card. |

Table 20 below sets out the format for the x_open_req message. This message creates a new transport endpoint, binds it to a transport provider, and, optionally, binds it to a dedicated backplane channel. The channel number is required for stream transports. It is optional for datagram transports.

XIP gateway module 41 may impose an upper limit on the number of open endpoints and reject extra ones with a TBADF error.

TABLE 20

```
struct x_open_req {
        uint8 command;            /* X_OPEN_REQ */
        uint8 result;             /* meaningless */
        uint16 reserved;
        uint32 p_endpoint;        /* peripheral endpoint number */
        uint32 d_endpoint;        /* I/O device endpoint number */
        uint32 transport;
        uint32 chan_len;
        uint8 channel[chan_len];  /* variable length */
};
```

| | |
|---|---|
| command | X_OPEN_REQ |
| result | Meaningless in this message. |
| p_endpoint | Peripheral endpoint number which sent this message. |
| d_endpoint | This field is meaningless since the device has not assigned an endpoint number yet.<br>eb;normal |
| transport | Transport protocol module number to bind to this endpoint. |
| chan_len | Size in bytes of the channel information that follows. Will be zero if peripheral equipment 33 does not support separate channels or does not wish to use one for this endpoint. |
| channel | Channel which peripheral equipment 33 will use for data transfer. The exact meaning of the channel field is specific to the communication method between peripheral equipment 33 and I/O device 34. For I/O, this field will be the 16 bit Peripheral Unit number selected by peripheral equipment 33. |

Table 21 below sets out the format for the x_ordrel_ack message. This message acknowledges an x_ordrel_req.

In order to synchronize the data stream, XIP API module 54 must also send an end-of-data flag on the dedicated data channel. See the backplane specifics section for how this is done. XIP gateway module 41 must receive both the x_ordrel_req and the matching end-of-data flag before acting on the request. Then it changes state, sends the orderly release to remote host 82, and sends the x_ordrel_ack. This could result in a significant delay between the x_ordrel_req and the x_ordrel_ack!

TABLE 21

```
struct x_ordrel_ack {
        uint8 command;       /* X_ORDREL_ACK */
        uint8 result;
        uint16 reserved;
        uint32 p_endpoint;   /* peripheral endpoint number */
        uint32 d_endpoint;   /* I/O device endpoint number */
        uint32 sync_num;     /* channel EOPD marker seq num */
};
```

| | |
|---|---|
| command | X_ORDREL_ACK |
| result | Result of the operation. Possible errors:<br>TBADF Unknown endpoint number.<br>TOUTSTATE Request not legal in current state.<br>TNOTSUPPORT Transport does not support this request.<br>TSYSERR System error.<br>TPROTO Other XIP protocol error. |
| p_endpoint | Peripheral endpoint number. |
| d_endpoint | Device endpoint which sent this message. |
| sync_num | Same number peripheral provided in the request. |

Table 22 below sets out the format for the x_ordrel_ind message. This message indicates that remote host 82 is done sending data. It is only legal for transport providers whose service type is COTS_ORD. Peripheral equipment 33 will not receive any more data, however it may continue to send data as long as it wishes.

In order to synchronize the data stream, XIP gateway module 41 must also send an end-of-data flag on the dedicated data channel. Peripheral equipment 33 must receive both the x_ordrel_ind and the matching end-of-data flag before changing state and delivering the event to the application.

TABLE 22

```
struct x_ordrel_ind {
    uint8 command;         /* X_ORDREL_IND */
    uint8 result;          /* meaningless */
    uint16 reserved;
    uint32 p_endpoint;     /* peripheral endpoint number */
    uint32 d_endpoint;     /* I/O device endpoint number */
    uint32 sync_num;       /* channel EOHD marker seq num */
};
```

| | |
|---|---|
| command | X_ORDREL_IND |
| result | Meaningless in this message. |
| p_endpoint | Peripheral endpoint number. |
| d_endpoint | Device endpoint which sent this message. |
| sync_num | Most recent end-of-host-data sequence number sent on dedicated channel. |

Table 23 below sets out the format for the x_ordrel_req message. This message begins an orderly connection release, also known as a half-close. It is only legal for transport providers whose service type is COTS_ORD. Peripheral equipment 33 may not send any more data once it starts an orderly connection shutdown. However, the remote end may continue to send data as long as it wishes and XIP API module 54 must be prepared to receive it.

In order to synchronize the data stream, XIP API module 54 must also send an end-of-data flag on the dedicated data channel.

TABLE 23

```
struct x_ordrel_req {
    uint8 command;         /* X_ORDREL_REQ */
    uint8 result;          /* meaningless */
    uint16 reserved;
    uint32 p_endpoint;     /* peripheral endpoint number */
    uint32 d_endpoint;     /* I/O device endpoint number */
    uint32 sync_num;       /* channel EOPD marker seq num */
};
```

| | |
|---|---|
| command | X_ORDREL_REQ |
| result | Meaningless in this message. |
| p_endpoint | Peripheral endpoint which sent this message. |
| d_endpoint | Device endpoint to send orderly release on. |
| sync_num | Most recent end-of-peripheral-data sequence number sent on dedicated channel. |

Table 24 below sets out the format for the x_sys_info_ack message. This message returns the system parameter requested by an x_sys_info_req message.

TABLE 24

```
struct x_sys_info_ack {
    uint8 command;         /* X_SYS_INFO_ACK */
    uint8 result;
    uint16 reserved;
    uint32 p_endpoint;     /* meaningless */
    uint32 d_endpoint;     /* meaningless */
    uint32 operation;
    uint32 status;         /* result of object access */
    uint32 object_id;
    uint32 val_len;
    uint8 value[val_len];  /* variable length */
};
```

| | |
|---|---|
| command | X_SYS_INFO_ACK |
| result | Result of the operation. Possible errors:<br>TSYSERR System error.<br>TPROTO Other XIP protocol error. |

TABLE 24-continued

| | |
|---|---|
| p_endpoint | Meaningless in this message. |
| d_endpoint | Meaningless in this message. |
| operation | Operation performed on object.<br>1 GET object's value.<br>2 SET object's value. |
| status | Result of operation on object. See the system information section for a list of status codes. |
| object_id | Object ID of system parameter returned. |
| val_len | Length of object's value. |
| value | The actual value of the object as a byte array. Peripheral equipment 33 must know how to interpret the contents of the array. |

Table 25 below sets out the format for the x_sys_info_req message. This message retrieves I/O device system parameters. It may be issued at any time and has no effect on any endpoint.

TABLE 25

```
struct x_sys_info_req {
    uint8 command;         /* X_SYS_INFO_REQ */
    uint8 result;          /* meaningless */
    uint16 reserved;
    uint32 p_endpoint;     /* meaningless */
    uint32 d_endpoint;     /* meaningless */
    uint32 operation;
    uint32 status;         /* meaningless */
    uint32 object_id;
    uint32 val_len;
    uint8 value[val_len];  /* variable length */
};
```

| | |
|---|---|
| command | X_SYS_INFO_REQ |
| result | Meaningless in this message. |
| p_endpoint | Meaningless in this message. |
| d_endpoint | Meaningless in this message. |
| operation | Operation to perform on object.<br>1 GET object's value.<br>2 SET object's value. |
| status | Meaningless in this message. |
| object_id | Object ID of system parameter requested. |
| val_len | Length of the object's value. Zero for a GET operation. |
| value | The actual value of the object. Only meaningful on SET operations. |

Table 26 below sets out the format for the x_unbind_ack message. This message acknowledges an x_unbind_req.

TABLE 26

```
struct x_unbind_ack {
    uint8 command;         /* X_UNBIND_ACK */
    uint8 result;
    uint16 reserved;
    uint32 p_endpoint;     /* peripheral endpoint number */
    uint32 d_endpoint;     /* I/O device endpoint number */
};
```

| | |
|---|---|
| command | X_UNBIND_ACK |
| result | Result of the operation. Possible errors:<br>TBADF Unknown endpoint number.<br>TOUTSTATE Request not legal in current state.<br>TSYSERR System error.<br>TPROTO Other XIP protocol error. |

TABLE 26-continued

| | |
|---|---|
| p_endpoint | Peripheral endpoint number. |
| d_endpoint | Device endpoint which sent this message. |

Table 27 below sets out the format for the x_unbind_req message. This message unbinds the local protocol address from an endpoint. The endpoint may then be rebound to a different address with x_bind_req or it may be closed with x_close_req.

TABLE 27

```
struct x_unbind_req {
    uint8 command;        /* X_UNBIND_REQ */
    uint8 result;         /* meaningless */
    uint16 reserved;
    uint32 p_endpoint;    /* peripheral endpoint number */
    uint32 d_endpoint;    /* I/O device endpoint number */
};
```

| | |
|---|---|
| command | X_UNBIND_REQ |
| result | Meaningless in this message. |
| p_endpoint | Peripheral endpoint which sent this message. |
| d_endpoint | Device endpoint to unbind. |

Table 28 below sets out the format for the x_unitdata_in message. This message delivers a datagram received on a connectionless transport endpoint.

TABLE 28

```
struct x_unitdata_in {
    uint8 command;              /* X_UNITDATA_IN */
    uint8 result;               /* meaningless */
    uint16 reserved;
    uint32 p_endpoint;          /* peripheral endpoint number */
    uint32 d_endpoint;          /* I/O device endpoint number */
    uint32 bind_seq;
    uint32 frag_flag;
    uint32 addr_len
    uint32 data_len
    uint8 address[addr_len];    /* variable length */
    uint8 data[data_len];       /* variable length */
};
```

| | |
|---|---|
| command | X_UNITDATA_IN |
| result | Meaningless in this message. |
| p_endpoint | Peripheral endpoint number. |
| d_endpoint | Device endpoint which sent this message. |
| bind_seq | Same bind sequence number specified by peripheral in the x_bind_req message. |
| frag_flag | Non-zero means that the next x_unitdata_in message will be part of the same TSDU. XIP gateway module 41 uses this flag when it can't fit the entire datagram TSDU in one backplane message. |
| addr_len | Size in bytes of the address that follows. |
| data_len | Size in bytes of the data that follows. |
| address | Remote address which sent this data. The address is only required on the first x_unitdata_in of a multi-part TSDU. It is optional on the following parts. See the transport specific address information for more details on address formats. |
| data | The actual packet data. |

Table 29 below sets out the format for the x_unitdata_out message. This message sends a datagram over a connectionless transport endpoint. Datagrams are unreliable. It is possible that the transport provider will drop the packet. There is no way to know if this happened.

TABLE 29

```
struct x_unitdata_out {
    uint8 command;              /* X_UNITDATA_OUT */
    uint8 result;               /* meaningless */
    uint16 reserved;
    uint32 p_endpoint;          /* peripheral endpoint number */
    uint32 d_endpoint;          /* I/O device endpoint number */
    uint32 bind_seq;
    uint32 frag_flag;
    uint32 addr_len;
    uint32 data_len;
    uint8 address[addr_len];    /* variable length */
    uint8 data[data_len];       /* variable length */
};
```

| | |
|---|---|
| command | X_UNITDATA_OUT |
| result | Meaningless in this message. |
| p_endpoint | Peripheral endpoint which sent this message. |
| d_endpoint | Device endpoint number. |
| bind_seq | Same bind sequence number specified by peripheral in the x_bind_req message. |
| frag_flag | Non-zero means that the next x_unitdata_out message will be part of the same TSDU. Peripheral equipment 33 uses this flag when it can't fit the entire datagram TSDU in one backplane message. |
| addr_len | Size in bytes of the address that follows |
| data_len | Size in bytes of the data that follows. |
| address | Remote address to send data to. The address is only required on the first x_unitdata_out of a multi-part TSDU. It is optional on the following parts. |
| data | The actual packet data. |

Table 30 below gives three list summaries of the messages by name, by sender and by function.

TABLE 30

| Listed by Name | Listed by Sender | Listed by Function |
|---|---|---|
| x_accept_ack | Peripheral | Initialize |
| x_accept_req | x_accept_req | x_new_state_ind |
| x_bind_ack | x_bind_req | x_new_state_res |
| x_bind_req | x_close_req | x_open_req |
| x_close_ack | x_conn_req | x_open_ack |
| x_close_req | x_discon_req | x_bind_req |
| x_conf_ind | x_ep_info_req | x_bind_ack |
| x_conn_ack | x_new_state_res | x_ep_info_req |
| x_conn_ind | x_open_req | x_ep_info_ack |
| x_conn_req | x_ordrel_req | x_sys_info_req |
| x_discon_req | x_sys_info_req | x_sys_info_ack |
| x_discon_ack | x_unbind_req | Active Connect |
| x_discon_ind | x_unitdata_out | x_conn_req |
| x_ep_info_ack | I/O Device | x_conn_ack |
| x_ep info_req | x_accept_ack | x_conf_ind |
| x_new_state_ind | x_bind_ack | Passive Connect |
| x_new_state_res | x_close_ack | x_conn_ind |
| x_open_ack | x_conf_ind | x_accept_req |
| x_open_req | x_conn_ack | x_accept_ack |
| x_ordrel_ack | x_conn_ind | Data Transfer |
| x_ordrel_ind | x_discon_ack | x_unitdata_in |
| x_ordrel_req | x_discon_ind | x_unitdata_out |
| x_sys info_ack | x_ep_info_ack | Disconnect |
| x_sys info_req | x_new_state_ind | x_discon_ind |

TABLE 30-continued

| Listed by Name | Listed by Sender | Listed by Function |
| --- | --- | --- |
| x_unbind_ack | x_open_ack | x_discon_req |
| x_unbind_req | x_ordrel_ack | x_discon_ack |
| x_unitdata_in | x_ordrel_ind | x_ordrel_ack |
| x_unitdata_out | x_sys_info_ack | x_ordrel_ind |
|  | x_unbind_ack | x_ordrel_req |
|  | x_unitdata_in | Deinitialize |
|  |  | x_close_req |
|  |  | x_close_ack |
|  |  | x_unbind_req |
|  |  | x_unbind_ack |

The following overview of the XIP protocol assumes some familiarity with network transports and APIs. A good background reference is the X/Open Transport Interface (XTI) Specification (document C438; available from X/Open by calling 415-323-7992).

XIP provides a way for network applications in peripheral equipment 33 to access transport provider services on an intelligent I/O device, such as I/O device 34. Peripheral equipment 33 provides an API library such as TLI or BSD Sockets. I/O device 34 provides network transports such as TCP, UDP, SPX, and IPX. XIP is how the API library and the transport provider communicate with each other. The following discussion specifies the messages exchanged between XIP API module 54 within peripheral equipment 33 and XIP gateway module 41 within I/O device 34.

To exchange messages there needs to be some communication mechanism between XIP API module 54 and I/O device 34. In FIG. 2 this communication mechanism is represented by I/O driver 55 within peripheral equipment 33 and by I/O driver 56 within I/O device 34. Collectively, the software and hardware part of the communication mechanism is referred to as "backplanes". The term "backplanes" encompasses actual physical backplanes, parallel cables, infrared links, and so on. Whatever the communication method, it must provide reliable delivery of XIP messages and data.

Most, if not all, backplanes provide multiple channels to multiplex communications between different entities on peripheral equipment 33 and I/O device 34. XIP will use a single channel for all control messages. XIP, Version 2 also includes the option to dedicate a backplane channel to each endpoint for data transfer. Channels are described in more detail below.

The fundamental XIP, Version 2 data structure is an endpoint. On peripheral equipment 33, endpoints map to sockets or file descriptors used by the application. On I/O device 34, they map to transport addresses (e.g. sockets or ports). Each endpoint has a unique identification number and state.

The communication channel(s) used for XIP must have the following four properties. The first property is reliability. All messages sent will be delivered intact. This implies that channels have flow control so the sender does not overrun the receiver.

The second property is internal ordering. All messages on a given channel will be delivered in the order sent.

The third property is an end-of-data flag. Data channels have some mechanism for sending a flag that marks the end of data in a given direction. If the same data channel will be reused for the next connection, the end-of-data flag must have a sequence number or some other way to uniquely identify it.

The fourth property is a half close. After sending an end-of-data flag in one direction, the other direction must continue to pass data.

Communication channels do not require the property of external ordering. Different channels do not require inter-channel ordering. In other words, messages sent on two different channels may be delivered in a different order.

The XIP protocol is initialized at boot time starting with an x_new_state_ind message from I/O device 34. The x_new_state_ind message tells peripheral equipment 33 that I/O device 34 supports XIP and provides a list of available transports and their state. Peripheral equipment 33 answers with an x_new_state_res. This exchange gets XIP up and running. Table 31 below summarizes this exchange.

TABLE 31

| Messages Initiated by Peripheral Equipment 33 | Message Direction | Messages Initiated by I/O device 34 |
| --- | --- | --- |
|  | <-- | x_new_state_ind |
| x_new_state_res | --> |  |

The first step to sending data is to create an endpoint. Peripheral equipment 33 sends I/O device 34 an x_open_req message which includes the number of the network transport peripheral equipment 33 wants to use. I/O device 34 creates an endpoint data structure, attaches it to the requested transport, and replies with an x_open_ack message. Peripheral equipment 33 can open as many endpoints as it needs at any time it wants to. I/O device 34 may impose an implementation dependent upper limit on the number of endpoints. Table 32 below summarizes this exchange.

TABLE 32

| Messages Initiated by Peripheral Equipment 33 | Message Direction | Messages Initiated by I/O device 34 |
| --- | --- | --- |
| x_open_req | --> |  |
|  | <-- | x_open_ack |

XIP supports two classes of transport: connection oriented (a.k.a. stream), and datagram. The discussion below gives steps for transferring data over each.

Endpoints are numbered. XIP is designed for "smart" I/O devices which have their own processor and memory. Thus, both peripheral equipment 33 and I/O device 34 maintain a data structure for each endpoint. Each chooses its own 32 bit numbers to address its own data structures. Peripheral equipment 33 and I/O device 34 exchange these numbers during endpoint creation.

When peripheral equipment 33 sends a message to an endpoint of I/O device 34, peripheral equipment 33 uses the number of I/O device 34 for that endpoint. When I/O device 34 sends a message to an endpoint of peripheral equipment 33, I/O device 34 includes the number of peripheral equipment 33 for that endpoint. Senders also include their own number for the endpoint. That way, replies can simply be sent back to the endpoint from which they originated.

Each endpoint has its own state. Table 33 below gives a summary of the states.

TABLE 33

| | |
|---|---|
| UNINIT | This state is never actually used since uninitialized endpoints don't exist. |
| UNBND | Endpoint is not bound to a protocol address. |
| IDLE | Endpoint is bound, but not connected. This is the data transfer state for datagram endpoints. |
| OUTCON | Endpoint is in the process of initiating a connection. |
| INCON | Endpoint has incoming connect requests pending. |
| DATAXFER | Endpoint is connected and able to transfer data. |
| OUTREL | Endpoint has performed an orderly release on the outbound half of the connection. No more data will be transmitted, but data may still be received. |
| INREL | Endpoint has performed an orderly release on the inbound half of the connection. No more data will be received, but data may still be transmitted. |

After creating an endpoint, the next step depends on how peripheral equipment 33 intends to use it. One type of endpoint, stream endpoints, can be used in three different ways. The can be used to initiate outgoing connections, to listen for incoming connections, and to accept incoming connections.

To initiate outgoing connections, the endpoint is usually bound to a dynamic address. Peripheral equipment 33 will send an x_bind_req with no address. I/O device 34 will automatically bind the endpoint to an unused local address. If, for some reason, the connection has to originate from a particular address, peripheral equipment 33 will specify that address in the x_bind_req message.

To listen for incoming connections, peripheral equipment 33 sends an x_bind_req message with a non-zero connection indication queue length. The queue holds pending connections until peripheral equipment 33 accepts (or rejects) them.

Incoming connections are often accepted on a different endpoint than they arrived on. That lets the listening endpoint continue listening for new connections. To accept a pending connect request, the accepting endpoint must be bound to the same address as the listen endpoint on which the connection arrived. If peripheral equipment 33 leaves the endpoint unbound, it will automatically be bound as the connection is accepted. Table 34 below summarizes this exchange.

TABLE 34

| Messages Initiated by Peripheral Equipment 33 | Message Direction | Messages Initiated by I/O device 34 |
|---|---|---|
| x_bind_req | --> | |
| | <-- | x_bind_ack |

There are two kinds of connection establishment. Active connection occurs when peripheral equipment 33 initiates a connection to a remote host. Passive connection occurs when a remote host initiates a connection to peripheral equipment 33.

To initiate an active connection, peripheral equipment 33 sends an x_conn_req message to a previously opened and bound endpoint on I/O device 34. The transport provider on I/O device 34 replies immediately with an x_conn_ack message and begins connecting to remote host 82. The connection is now in progress, but is not fully up yet. It takes time for remote host 82 to receive and respond to the request.

Hopefully not too much later, the transport module receives the response, completes the connection, and sends peripheral equipment 33 an x_conf_ind message to confirm it. Now the connection is fully up and peripheral equipment 33 can send data. Table 35 below summarizes this exchange.

TABLE 35

| Messages Initiated by Peripheral Equipment 33 | Message Direction | Messages Initiated by I/O device 34 |
|---|---|---|
| x_conn_req | --> | |
| | <-- | x_conn_ack |
| | <-- | x_conn_ind |
| x_accept_req | --> | |
| | <-- | x_accept_ack |

To wait for passive connections to arrive, peripheral equipment 33 creates a listen endpoint by specifying a connect queue length in the x_bind_req. The bind will also normally specify the local address since otherwise it is hard for remote host 82 to know what random unused address I/O device 34 picked.

When a connect request arrives from a remote host, I/O device 34 sends an x_conn_ind message to peripheral equipment 33. Peripheral equipment 33 picks an endpoint on which to accept the connection and sends back an x_accept_req message. I/O device 34 immediately acknowledges peripheral equipment 33 with an x_accept_ack message and also sends a reply to remote host 82.

At this point, the connection is up as far as peripheral equipment 33 is concerned. However, the transport module is still waiting for remote host 82 to confirm the connection. XIP does not include a state for this condition because the TLI API does not recognize this state and does not provide any way to tell the application when the connection is fully up. TLI assumes the connection is up as soon as it receives the x_accept_ack message.

Thus, I/O device 34 goes to the DATAXFER state as soon as it sends the x_accept_ack. It may use flow control to prevent peripheral equipment 33 from actually sending data until the connection is fully up. Table 35 below summarizes this exchange.

TABLE 35

| Messages Initiated by Peripheral Equipment 33 | Message Direction | Messages Initiated by I/O device 34 |
|---|---|---|
| | <-- | x_conn_ind |
| x_accept_req | --> | |
| | <-- | x_accept_ack |

One more complication is peripheral equipment 33 may choose to accept a connection two different ways. It may accept on the same endpoint on which the connection arrived or on a different one. Using the same endpoint prevents that endpoint from listening for new connections for the duration of the current connection. To avoid that, peripheral equipment 33 may pass the connection to a different endpoint so the original one can keep listening. Table 36 below summarizes this scenario.

TABLE 36

| Messages Initiated by Peripheral Equipment 33 | | Message Direction | Messages Initiated by I/O device 34 | |
|---|---|---|---|---|
| Pass Endpoint | Listen Endpoint | | Listen Endpoint | Pass Endpoint |
| | x_open_req | --> | | |
| | | <-- | x_open_ack | |
| | x_bind_req | --> | | |
| | | <-- | x_bind_ack (later) | |
| | | <-- | x_conn_ind | |
| x_open_req | | --> | | |
| | | <-- | | x_open_ack |
| | x_accept_req | --> | | |
| (DATA-XFER state) | | <-- | x_accept_ack | (DATA-XFER state) |

The x_open_req exchange shown in Table 36 above could also be done well in advance of actually accepting the connection. It is up to the application to manage its accepting endpoints. The accepting endpoint also does not have to be bound to an address. In that case, I/O device 34 will automatically bind it to the same address as the listening endpoint.

For data transfer, each connection has its own dedicated backplane channel that takes care of sending and receiving data, flow control, etc. XIP does not specify the actual stream data transfer mechanism. Various backplane transfer data differently. Table 37 below sets out an example for the IIO backplane protocol.

TABLE 37

| Messages Initiated by Peripheral Equipment 33 | Message Direction | Messages Initiated by I/O device 34 |
|---|---|---|
| PACKET_WRITE | --> | |
| | <-- | PACKET_READ |

There are two ways to disconnect a stream: orderly and abortive.

Orderly releases are reliable so that both sides know all data was delivered. When one end of the connection is finished sending data, it indicates an orderly release which tells the other end that no more data will be arriving on this connection. When the other end is finished it does the same. When both sides have received a release the connection is considered down. An orderly release is also known as a "half-close" because data can still arrive after sending a release.

Abortive releases are unreliable. The connection is terminated immediately with no acknowledgments. Data may be lost! Any data which is queued to be sent may be dropped. Any data received after an abort may be dropped.

Either end of the stream can initiate either kind of disconnect. They are called local and remote disconnect to distinguish who initiated it.

XIP communicates all types of disconnect with messages on the XIP control channel. Those disconnects also have to be synchronized with data on the data channel. XIP assumes no synchronization between channels so it is possible for control messages to "pass up" data packets leading to race conditions. In some case, these race conditions can even cause data loss.

To prevent that, XIP uses an end-of-data marker in the data channel after the last valid data for the connection. The marker travels in the same channel as the data so it remains in the correct place in the data stream. Note that the marker does not initiate the disconnect or cause any endpoint state change. It only provides a synchronization point for the disconnect messages on the control channel.

The actual marker mechanism is backplane specific. On IIO, XIP uses the command information field of the IIO packet header. The markers are CI_ACTION_SYNC_END_OF_HOST_DATA (EOHD) for the inbound side and CI_ACTION_END_OF_PERIPHERAL_DATA (EOPD) for the outbound side. Other backplanes will use markers with the similar meanings. EOHD requires peripheral equipment 33 to answer by sending an EOHD acknowledgment (EOHDa) on the outbound side. The EOHDa must not be sent until all data, including any EOPD, is sent. EOPD does not require any answer from I/O device 34.

The tables below which describe various releases show the message and flag exchange for each connection termination scenario. Events in the tables below listed in capital letters (CAPS) travel in the data channel. Events in the tables listed in lower case travels in the control channel. The numbers in parenthesis are example EOHD and EOPD sequence numbers.

Table 38 below describes a local release.

TABLE 38

| Messages Initiated by Peripheral Equipment 33 | | Message Direction | Messages Initiated by I/O device 34 | |
|---|---|---|---|---|
| Data | Control | | Control | Data |
| (normal data flow) | | --> | | |
| EOPD (10) | x_ordrel_req (10) | --> | | |
| | | <-- | x_ordrel_ack (10) | |
| | | <-- | | (possibly more data) |
| | | <-- | x_ordrel_ind (20) | EOHD (20) |
| EOHDa (20) | | --> | | |

I/O device 34 may not send a successful x_ordrel_ack until it has received the matching EOPD. Peripheral equipment 33 must receive both the x_ordrel_ind message and its matching EOHD flag before changing state and notifying the application. Peripheral equipment 33 also may not send the EOHDa until it has sent the EOPD.

Table 39 below describes a remote release.

TABLE 39

| Messages Initiated by Peripheral Equipment 33 | | Message Direction | Messages Initiated by I/O device 34 | |
|---|---|---|---|---|
| Data | Control | | Control | Data |
| | | <-- | | (normal data flow) |
| | | <-- | x_ordrel_ind (20) | EOHD (20) |
| (possibly more data) | | --> | | |
| EOPD (10) | x_ordrel_req (10) | --> | | |
| EOHDa (20) | | --> | | |
| | | <-- | x_ordrel_ack (10) | |

Peripheral equipment 33 must receive both the x_ordrel_ind message and its matching EOHD flag before changing state and notifying the application. I/O device 34 may not send a successful x_ordrel_ack until it has received the matching EOPD.

Table 40 below describes a local abort.

TABLE 40

| Messages Initiated by Peripheral Equipment 33 | | Message Direction | Messages Initiated by I/O device 34 | |
|---|---|---|---|---|
| Data (normal data flow) | Control | --> | Control | Data |
|  | x_discon_req | --> |  |  |
|  |  | <-- | x_discon_ack (20) | EOHD (20) |
| EOHDa (20) |  | --> |  |  |

After sending the x_discon_req, peripheral equipment 33 may drop all data until it sees the x_discon_ack and the EOHD with the matching number (20 in this example). After receiving the x_discon_req, peripheral equipment 33 may drop all data until it sees the EOHDa with the matching number (20 in this example).

Table 41 below describes a remote abort.

TABLE 41

| Messages Initiated by Peripheral Equipment 33 | | Message Direction | Messages Initiated by I/O device 34 | |
|---|---|---|---|---|
| Data | Control | <-- | Control | Data (normal data flow) |
|  |  | <-- | x_discon_ind (20) | EOHD (20) |
| EOHDa (20) |  | --> |  |  |

After sending the x_discon_ind, I/O device 34 may drop all data until it sees the EOHDa with the matching number (20 in this example). After receiving the x_discon_ind, peripheral equipment 33 may drop all data until it sees the EOHD with the matching number (20 in this example).

Table 42 below describes the interchange for transport down. When an I/O device transport protocol module goes down, I/O device 34 aborts all connections and closes all endpoints associated with that transport. There are no XIP messages for each endpoint. Everything is implicit in the x_new_state_ind message. However, I/O device 34 must send an EOHD flag on each channel connected to that transport which had an established connection. Peripheral equipment 33 should treat this as a remote abort on each affected endpoint.

When the transport module comes back up, I/O device 34 sends another x_new_state_ind message. None of the endpoints for other transports should be affected by either message.

TABLE 42

| Messages Initiated by Peripheral Equipment 33 | | Message Direction | Messages Initiated by I/O device 34 | |
|---|---|---|---|---|
| Data | Control |  | Control | Data |
|  |  |  | (xport down) |  |
|  |  | <-- | x_new_state | EOHD |

TABLE 42-continued

| Messages Initiated by Peripheral Equipment 33 | | Message Direction | Messages Initiated by I/O device 34 | |
|---|---|---|---|---|
|  |  |  | _ind (20) | (20) |
| EOHDa (20) | x_new_state _res (20) | --> |  |  |
|  |  |  | (xport back up) |  |
|  |  | <-- | x_new_state _ind (20) |  |
|  | x_new_state res (20) | --> |  |  |

I/O device 34 sends an EOHD on every channel whose endpoint was in DATAXFER, INREL, or OUTREL state and whose transport went down. Peripheral equipment 33 must acknowledge the EOHD on every channel with an EOHDa containing the same sequence number. Sequence numbers must always increase, and this number is shared by all channels, so I/O device 34 must choose one bigger than the maximum number used on all affected channels.

Table 43 below illustrated connection reject. In rare situations either end may reject a connect request. The application in peripheral equipment 33 may reject a passive connect or remote host 82 may reject an active connect. Peripheral equipment 33 rejects a passive connect by sending an x_discon_req instead of an x_accept_req.

TABLE 43

| Messages Initiated by Peripheral Equipment 33 | Message Direction | Messages Initiated by I/O device 34 |
|---|---|---|
|  | <-- | x_conn_ind |
| x_discon_req | --> |  |
|  | <-- | x_discon_ack |

I/O device 34 indicates that remote host 82 rejected an active connect by sending an x_discon_ind instead of an x_conf_ind. This is illustrated by Table 44 below.

TABLE 44

| Peripheral | Message Direction | Messages Initiated by I/O device 34 |
|---|---|---|
| x_conn_req | --> |  |
|  | <-- | x_conn_ack |
|  | <-- | x_discon_ind |

In reject cases, the endpoint never made it to DATAXFER state so there is no need to synchronize the data channel. I/O device 34 does not need to send an EOHD marker.

Datagram endpoints are created with x_open_req, just like stream endpoints. What makes them different is they are connected to a datagram transport instead. Datagram endpoints have the option to use a dedicated channel or the XIP control channel for their data transfer.

After creating a datagram endpoint, peripheral equipment 33 sends an x_bind_req message to give the endpoint a local address. As with stream endpoints, peripheral equipment 33 may specify the address or allow I/O device 34 to assign an unused one.

When the endpoint will use a dedicated channel for data transfer, each x_bind_req on that endpoint must contain a unique bind sequence number. The same number is used in every x_unitdata_out and x_unitdata_in message. Otherwise, if peripheral equipment 33 rebinds the endpoint, there is a race condition where a stale packet in the data channel can be delivered to the wrong address. This is illustrated by Table 45 below.

TABLE 45

| Messages Initiated by Peripheral Equipment 33 | Message Direction | Messages Initiated by I/O device 34 |
|---|---|---|
| x_open_req | --> | |
| | <-- | x_open_ack |
| x_bind_req | --> | |
| | <-- | x_bind_ack |

Datagrams may be transferred over a dedicated backplane channel or over the XIP control channel. The message is exactly the same for both. Every packet on the data channel has an XIP message header that includes the remote address. The advantage to using dedicated channels is peripheral equipment 33 can manage buffers differently. It could, for example, use larger buffers on the dedicated channels to increase datagram throughput. It can also prevent one endpoint from starving others for control channel buffers.

When using dedicated channels, every datagram message header must also include a bind sequence number. This is the same number assigned by peripheral equipment 33 in the most recent x_bind_req on this endpoint. Peripheral equipment 33 and I/O device 34 drop all datagrams that don't match the latest bind sequence number to avoid the stale datagram race condition. This is illustrated by Table 46 below.

TABLE 46

| Messages Initiated by Peripheral Equipment 33 | Message Direction | Messages Initiated by I/O device 34 |
|---|---|---|
| x_unitdata_out | --> | |
| | <-- | x_unitdata_in |

Table 47 below illustrates deinitialization. When peripheral equipment 33 is done with a particular transport address it may unbind that address from the endpoint with an x_unbind_req message. Peripheral equipment 33 may then rebind the endpoint to a different address or close it.

TABLE 47

| Messages Initiated by Peripheral Equipment 33 | Message Direction | Messages Initiated by I/O device 34 |
|---|---|---|
| x_unbind_req | --> | |
| | <-- | x_unbind_ack |

When peripheral equipment 33 is done with an endpoint it removes that endpoint with an x_close_req message. This is illustrated by Table 48.

TABLE 48

| Messages Initiated by Peripheral Equipment 33 | Message Direction | Messages Initiated by I/O device 34 |
|---|---|---|
| x_close_req | --> | |
| | <-- | x_close_ack |

Each endpoint is controlled by an endpoint state machine. Table 33 above shows the states in the endpoint state machine.

Table 49 below shows what request messages peripheral equipment 33 may send to an endpoint in each state.

TABLE 49

| | UNINIT | UNBND | IDLE | OUT CON | IN CON | DATA XFER | OUT REL | IN REL |
|---|---|---|---|---|---|---|---|---|
| x_open_req | YES | | | | | | | |
| x_ep_info_req | | YES | YES | YES | YES | YES | YES | YES |
| x_bind_req | | YES | | | | | | |
| x_unitdata_out | | | YES | | | | | |
| x_conn_req | | | YES | | | | | |
| x_accept_req | | | | | YES | | | |
| x_ordrel_req | | | | | | YES | | YES |
| x_dison_req | | | | YES | YES | YES | YES | YE |
| x_unbind_req | | | YES | | | | | |
| x_close_req | | YES | | | | | | |

Table 50 below shows what asynchronous messages I/O device 34 may send to an endpoint in each state. (It does not show acknowledgment messages. They are always sent in response to a peripheral request.)

TABLE 50

|  | UN INIT | UN BND | IDLE | OUT CON | IN CON | DATA XFER | OUT REL | IN REL |
|---|---|---|---|---|---|---|---|---|
| x_unitdata_in |  |  | YES |  |  |  |  |  |
| x_conn_ind |  |  | YES |  | YES |  |  |  |
| x_conf_ind |  |  |  | YES |  |  |  |  |
| x_ordrel_ind |  |  |  |  |  | YES | YES |  |
| x_discon_ind |  |  |  | YES | YES | YES | YES | YES |
| x_new_state_ind | YES | YES | YES | YES | YES | YES | YES | YES |

Table 51 below shows the state transitions caused by various events. XIP changes states on _IND and successful _ACK messages. It does not 10 change state on _REQ messages or _ACK messages with a non-zero result code.

request in progress and proceed with the x_discon_req message. That means there may be no response to the previous request. Table 52 gives an example using a local release.

TABLE 51

|  | UN INIT | UN BND | IDLE | OUT CON | IN CON | DATA XFER | OUT REL | IN REL |
|---|---|---|---|---|---|---|---|---|
| x_open_ack | UN BND |  |  |  |  |  |  |  |
| x_bind_ack |  | IDLE |  |  |  |  |  |  |
| x_unitdata_in |  |  | IDLE |  |  |  |  |  |
| x_unitdata_out |  |  | IDLE |  |  |  |  |  |
| x_conn_ack |  |  | OUT CON |  |  |  |  |  |
| x_conf_ind |  |  |  | DATA XFER |  |  |  |  |
| x_conn_ind |  |  | IN CON |  | IN CON |  |  |  |
| x_accept_ack |  |  |  |  | IDLE 1,2 |  |  |  |
| <pass conn>3 |  |  | DATA XFER | DATA XFER |  |  |  |  |
| x_ordrel_ack |  |  |  |  |  | OUT REL |  | IDLE |
| x_ordrel_ind |  |  |  |  |  | IN REL | IDLE |  |
| x_discon_ack |  |  |  | IDLE | IDLE2 | IDLE | IDLE | IDLE |
| x_discon_ind |  |  |  | IDLE | IDLE2 | IDLE | IDLE | IDLE |
| x_unbind_ack |  |  | UN BND |  |  |  |  |  |
| x_close_ack |  | UN INIT |  |  |  |  |  |  |
| x_new_state_ind | UN INIT | UN INIT | UN INIT | UN INIT | UN INIT | UN INIT | UN INIT | UN INIT |

50

If the accepting endpoint is the same as the listening endpoint, the next state is DATAXFER. If any other connect requests are pending, the endpoint stays in INCON state. This event is implicit on a successful x_accept_ack when the accepting endpoint is different from the listening endpoint.

Table 53 below illustrates override messages. Normally peripheral equipment 33 is not allowed (nor does it make sense) to send another _REQ message on an endpoint until it receives the _ACK from the previous request. The only exception is the x_discon_req message does not have to wait for another outstanding request to complete. This allows peripheral equipment 33 to abort a connection when things are stopped up. Since this message may override anything else in progress, I/O device 34 is free to drop the

TABLE 52

| Messages Initiated by Peripheral Equipment 33 | | Message Direction | Messages Initiated by I/O device 34 | |
|---|---|---|---|---|
| Data | Control |  | Control | Data |
| EOPD | x_ordrel_req | --> |  |  |
| (delayed) |  |  |  |  |
| (user tires of waiting) |  |  |  |  |
|  | x_discon_req | --> |  |  |
|  |  | <-- | x_discon_ack | EOHD |
| EOHDa |  | --> |  |  |

Peripheral equipment 33 and I/O device 34 both keep track of the endpoint state. Most state changes are driven by API calls from the application on peripheral equipment 33. They cause peripheral equipment 33 to send XIP request messages to I/O device 34. However, some state changes are driven by the remote host transport. I/O device 34 informs peripheral equipment 33 of these events with XIP indication messages.

There are some race conditions where peripheral requests and I/O device indications can cross in the backplane. There are also race conditions where override messages (see above) cross with the acknowledgment to the request they are overriding. They must be handled carefully to avoid situations where peripheral equipment 33 and I/O device have different states for the same endpoint. When a race happens, a request generally arrives after I/O device 34 has already made a state change caused by another message. I/O device 34 will respond with an error, usually TOUTSTATE. Peripheral equipment 33 must make state changes only on indication or acknowledgment messages from I/O device 34. Peripheral equipment 33 does not change state when it issues a request. That way the messages make sense since peripheral equipment 33 and I/O device process them in the same order.

Table 53 below gives an example of a race condition which results from simultaneous release. Simultaneous release looks just like remote release to I/O device 34. It looks almost the same as local release to peripheral equipment 33. The only difference is that the x_ordrel_ind arrives before the x_ordrel_ack. I/O device 34 goes to INREL state when it sends the x_ordrel_ind and IDLE when it sends the x_ordrel_ack. Peripheral equipment 33 goes to INREL state when it receives the x_ordrel_ind and then IDLE when it receives the x_ordrel_ack.

TABLE 53

| Messages Initiated by Peripheral Equipment 33 | | | Message | Messages Initiated by I/O device 34 | | |
|---|---|---|---|---|---|---|
| State | Data | Control | Direction | Control | Data | State |
| DATAXFER | EOPD | x_ordrel_req | --> | | | DATAXFER |
| DATAXFER | | | <-- | x_ordrel_ind | EOHD | INREL |
| IDLE | | | <-- | x_ordrel_ack | | IDLE |
| IDLE | EOHDa | | --> | | | IDLE |

Table 54 below gives an example of a race condition which results from simultaneous abort. As illustrated by Table 54, the application on peripheral equipment 33 calls t_sndrel( ). Peripheral equipment 33 sends an x_discon_req message. Meanwhile, I/O device 34 receives a disconnect from the remote transport. I/O device 34 sends an x_discon_ind message to peripheral equipment 33 and goes to IDLE state. Peripheral equipment 33 receives the x_discon_ind, goes to IDLE state, and returns from the t_sndrel( ) call with a TLOOK(DISCONNECT) error. I/O device 34 receives the x_discon_req and responds with a TOUTSTATE error. Peripheral equipment 33 receives the x_discon_ack message and ignores it.

This is a race between the x_discon_req and the x_discon_ind. I/O device 34 receives the x_discon_req after sending the x_discon_ind. The x_discon_ack has a result of TOUTSTATE because I/O device 34 is already in IDLE state.

TABLE 54

| Messages Initiated by Peripheral Equipment 33 | | | Message | Messages Initiated by I/O device 34 | | |
|---|---|---|---|---|---|---|
| State | Data | Control | Direction | Control | Data | State |
| DATAXFER | | x_discon_req | --> | | | DATAXFER |
| DATAXFER | | | <-- | x_discon_ind | EOHD | IDLE |
| IDLE | | | <-- | x_discon_ack | | IDLE |
| IDLE | EOHDa | | --> | | | IDLE |

The x_sys_info_req message essentially provides peripheral equipment 33 with access to the Management Information Base (MIB) of I/O device 34. Other protocols, such as SNMP and PML, already exist for accessing MIBs and are more powerful.

Table 55 below shows the available MIB for an embodiment of the present invention. All objects are returned as byte arrays. Peripheral equipment 33 is expected to know how to interpret the value. Some information is only valid for a limited time. For example, the IP address is not guaranteed valid after an x_new_state_ind.

TABLE 55

| | |
|---|---|
| XM_OID_MAC_ADDR | I/O device's MAC address. Value is a six byte array. |
| XM_OID_DNS_NAME | I/O device's DNS name. Value is a character string. |
| XM_OID_DNS_ADDR | DNS and/or WINS server address. Value is an XIP address structure suitable for use in an x_unitdata_out message. |
| XM_OID_IP_ADDR | I/O device's IP address. Value is a 32 bit integer. |
| XM_OID_NW_NAME | I/O device's Novell name. Value is a character sting. |
| XM_OID_IPX_ADDR | I/O device's IPX address. Value is an XIP address structure with a socket of zero. |
| XM_OID_PORT_NUM | Port number of multi-port I/O device (e.g. JetDirect EX3) which peripheral is connected to. Value is a 32 bit integer. First port is number zero. |
| XM_OID_PROD_NUM | I/O device's product number. Value is a character string. |
| XM_OID_FW_REV | I/O device's firmware revision. Value is a character string. |
| XM_OID_SNMP_REQ | I/O device interprets the value as an SNMP request. |
| XM_OID_PML_REQ | I/O device interprets the value as a PML request. |
| XM_OID_MFG_ID | I/O device's Manufacturing ID. Value is a character string. |
| XM_OID_TCPIP_STATUS | I/O device's TCP/IP status, as normally provided on selftest page. Value is a character string. |
| XM_OID_SUBNET_MASK | I/O device's Subnet Mask. Value is a 32 bit integer. |
| XM_OID_GATEWAY | I/O device's Default Gateway Address. Value is a 32 bit integer. |
| XM_OID_PKTS_RCVD | Total network packets received. Value is a 32 bit integer. |
| XM_OID_BAD_PKTS_RCVD | Total network bad packets received. Value is a 32 bit integer. |
| XM_OID_FRAME_ERR_RCVD | Total network packets with framing errors received, as normally provided on selftest page. Value is a 32 bit integer. |
| XM_OID_PKTS_XMT | Total network packets transmitted. Value is a 32 bit integer. |
| XM_OID_XMIT_COLSN | Total network collisions detected. Value is a 32 bit integer. |
| XM_OID_XMIT_LCOLSN | Total network late collisions detected. Value is a 32 bit integer. |

Table 56 sets out status codes for the preferred embodiment.

TABLE 56

| | |
|---|---|
| XM_NOERROR | Success. |
| XM_TOOBIG | Value is too big. |
| XM_NOSUCHNAME | Unknown object id. |
| XM_BADVALUE | Bad value on SET. |
| XM_READONLY | Object can't be set. |
| XM_GENERR | Other error. |
| XM_UNAVAILNOW | Object temporarily unavailable. |

Table 57 sets out assigned numbers for the preferred embodiment of the present invention.

TABLE 57

```
const int XIP_VERSION = 0x0201;
enum xip_commands {
    X_NEW_STATE_IND    = 16,
    X_NEW_STATE_RES    = 17,
    X_ACCEPT_ACK       = 18,
    X_ACCEPT_REQ       = 19,
```

TABLE 57-continued

```
    X_BIND_ACK         = 20,
    X_BIND_REQ         = 21,
    X_CLOSE_ACK        = 22,
    X_CLOSE_REQ        = 23,
    X_CONF_IND         = 24,
    X_CONN_ACK         = 25,
    X_CONN_IND         = 26,
    X_CONN_REQ         = 27,
    X_DISCON_ACK       = 28,
    X_DISCON_IND       = 29,
    X_DISCON_REQ       = 30,
    X_EP_INFO_ACK      = 31,
    X_EP_INFO_REQ      = 32,
    X_OPEN_ACK         = 33,
    X_OPEN_REQ         = 34,
    X_ORDREL_IND       = 35,
    X_ORDREL_ACK       = 36,
    X_ORDREL_REQ       = 37,
    X_SYS_INFO_ACK     = 38,
    X_SYS_INFO_REQ     = 39,
    X_UNBIND_ACK       = 40,
    X_UNBIND_REQ       = 41,
    X_UNITDATA_IN      = 42,
```

TABLE 57-continued

```
    X_UNITDATA_OUT    = 43,
};
enum xip_protocol_numbers {
    XIP_TCP_PROTOCOL = 6,
    XIP_UDP_PROTOCOL = 17,
    XIP_IPX_PROTOCOL = 1000,
    XIP_SPX_PROTOCOL = 1256,
    XIP_NNH_PROTOCOL = 4660
};
enum xip_address_families {
    XIP_TCP_FAMILY = 2,
    XIP_UDP_FAMILY = 2,
    XIP_IPX_FAMILY = 6,
    XIP_SPX_FAMILY = 6,
    XIP_NNH_FAMILY = 22136
};
enum xip_service_types {
    T_COTS    = 1,
    T_COTS_ORD = 2,
    T_CLTS    = 3
};
enum xip_endpoint_states {
    T_UNINIT  = 0,  /* uninitialized */
    T_UNBND   = 1,  /* unbound */
    T_IDLE    = 2,  /* idle */
    T_OUTCON  = 3,  /* outgoing connection pending */
    T_INCON   = 4,  /* incoming connection pending */
    T_DATAXFER = 5, /* data transfer */
    T_OUTREL  = 6,  /* outgoing orderly release sent */
    T_INREL   = 7,  /* incoming orderly release received */
};
/* These are the same error codes used by XTI. */
enum xip_error_codes {
    TBADADDR      = 1,  /* incorrect addr format */
    TBADOPT       = 2,  /* incorrect option format */
    TBADF         = 4,  /* bad endpoint number */
    TNOADDR       = 5,  /* couldn't allocate addr */
    TOUTSTATE     = 6,  /* out of state */
    TBADSEQ       = 7,  /* bad call sequence number */
    TSYSERR       = 8,  /* system error */
    TBADDATA      = 10, /* illegal amount of data */
    TNOTSUPPORT   = 18, /* primitive not supported */
    TBADNAME      = 21, /* bad transport number */
    TADDRBUSY     = 23, /* address in use */
    TINDOUT       = 24, /* outstanding connect indications */
    TPROVMISMATCH = 25, /* transport provider mismatch */
    TRESQLEN      = 26, /* resfd has qlen >0 */
    TRESADDR      = 27, /* accept on different addr */
    TPROTO        = 29, /* other protocol error */
    /* The following error codes are XIP specific. */
    TTPDOWN       = 52, /* transport is down */
    TBADCHAN      = 53, /* bad channel */
};
enum xip_mib_oid_codes {
    XM_OID_SNMP_REQ        = 1,
    XM_OID_PML_REQ         = 2,
    XM_OID_MAC_ADDR        = 3,
    XM_OID_DNS_NAME        = 4,
    XM_OID_DNS_ADDR        = 5,
    XM_OID_IP_ADDR         = 6,
    XM_OID_NW_NAME         = 7,
    XM_OID_IPX_ADDR        = 8,
    XM_OID_PORT_NUM        = 9,
    XM_OID_PROD_NUM        = 10,
    XM_OID_FW_REV          = 11,
    XM_OID_MFG_ID          = 12,
    XM_OID_TCPIP_STATUS    = 13,
    XM_OID_SUBNET_MASK     = 14,
    XM_OID_GATEWAY         = 15,
    XM_OID_PKTS_RCVD       = 16,
    XM_OID_BAD_PKTS_RCVD   = 17,
    XM_OID_FRAME_ERR_RCVD  = 18,
    XM_OID_PKTS_XMT        = 19,
    XM_OID_XMIT_COLSN      = 20,
    XM_OID_XMIT_LCOLSN     = 21,
};
enum xip_mib_error_codes {
    XM_NOERROR    = 0,  /* Success */
    XM_TOOBIG     = 1,  /* Value is too big */
```

TABLE 57-continued

```
    XM_NOSUCHNAME = 2,  /* Unknown object id */
    XM_BADVALUE   = 3,  /* Bad value on SET */
    XM_READONLY   = 4,  /* Object can't be set */
    XM_GENERR     = 5,  /* Other error */
    XM_UNAVAILNOW = 6,  /* Object temporarily unavailable */
};
```

Table 58 shows the relationship between the XTI (or TLI) API calls and the XIP messages to which they relate.

TABLE 58

| XTI Call | XIP Message |
|---|---|
| t_accept() | x_accept_req |
| t_bind() | X_bind_req |
| t_close() | x_close_req |
| t_connect() | x_conn_req |
| t_getinfo() | x_ep_info_req |
| t_listen() | x_conn_ind |
| t_open() | x_open_req |
| t_rcvconnect() | x_conf_ind |
| t_rcvdis() | x_discon_ind |
| t_rcvrel() | x_ordrel_ind |
| t_rcvudata() | x_unitdata_in |
| t_snddis() | x_discon_req |
| t_sndrel() | x_ordrel_req |
| t_sndudata() | x_unitdata_out |
| t_unbind() | x_unbind_req |

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. An input/output device for connection to peripheral equipment, the peripheral equipment having an application programming interface (API) module within which at least one datagram communication endpoint is generated, the input/output device comprising:

a plurality of network transport modules, each network transport module implementing a different network protocol;

a communication mechanism for communication with the peripheral equipment; and, a gateway module, coupled to each of the network transport modules and to the communication mechanism;

wherein for each datagram communication endpoint within the API module within the peripheral equipment, a corresponding datagram communication endpoint is implemented within the gateway module, wherein a control channel between the gateway module and the API module is used to transport control messages between the gateway module and the API module, and wherein for a network transport module which requires data stream communication, control messages are exchanged over the control channel and data stream communication is established via a separate communication channel between the gateway module and the API module.

2. An input/output device as in claim 1 wherein the separate communication channel is initiated by:

the API module sending a connection request message to the gateway module;

the gateway module first responds by returning a connection acknowledgment message to the API module and forwarding the connection request to a remote host; and, the gateway module sending a confirmation indication message to the API module upon the gateway module establishing a connection with the remote host.

3. An input/output device as in claim 1 wherein the separate communication channel is initiated by:

the gateway module sending a connection indication message to the API module upon the gateway module receiving a connect request from a remote host;

the API module responding by sending an accept request message to the gateway module; and, the gateway module responding by sending an accept acknowledgment message to the API module.

4. An input/output device as in claim 1 wherein the separate communication channel is released by:

the API module sending an end of peripheral data message to the gateway module via the communication channel;

the API module sending an orderly release request to the gateway module via the control channel;

the gateway module responding by sending an orderly release acknowledgment message to the API module via the control channel;

the gateway module sending an end of host data message to the API module via the communication channel after the remote host sends an end of connection indication;

the gateway module sending an orderly release indication message to the API module via the control channel; and, the API module sending an end of host data acknowledgment message to the gateway module via the communication channel.

5. An input/output device as in claim 1 wherein the separate communication channel is released by:

the gateway module sending an end of host data message to the API module via the communication channel;

the gateway module sending an orderly release indication message to the API module via the control channel;

the API module sending an end of peripheral data message to the gateway module via the communication channel;

the API module sending an orderly release request to the gateway module via the control channel;

the API module sending an end of host data acknowledgment message to the gateway module via the communication channel; and, the gateway module responding by sending an orderly release acknowledgment message to the API module via the control channel.

6. An input/output device as in claim 1 wherein when the network transport module becomes disabled, the separate communication channel is released by:

the gateway module sending an end of host data message to the API module via the communication channel;

the gateway module sending a new state indication message to the API module via the control channel;

the API module sending an end of host data acknowledgment message to the gateway module via the communication channel; and, the API module sending a new state response message to the gateway module via the communication channel, the new state response message acknowledging receipt of the new state indication message.

7. An input/output device as in claim 6 wherein the gateway module signals that the transport module is enabled by sending a new state indication message to the API module via the control channel, and the API module responds by sending a new state response message to the gateway module via the communication channel.

8. An input/output device as in claim 1 wherein a local protocol address is bound to a previously opened datagram communication endpoint by:

the API module sending a bind request message to the gateway module, the bind request message including a bind sequence number; and, the gateway module sending a bind acknowledge message to the API module.

9. An input/output device as in claim 1 wherein the API module obtains system parameters of the input/output device by:

the API module sending a system information request message to the gateway module; and, the gateway module sending a system information acknowledgment message to the API module, the system information acknowledgment message including information on the parameters of the input/output device.

10. Peripheral equipment for connection to an input/output device, the peripheral equipment comprising:

a communication mechanism for communication with the input/output device; and an application programming interface (API) module, coupled to the communication mechanism, the API module generating datagram communication endpoints;

wherein for each datagram communication endpoint within the API module, a corresponding datagram communication endpoint is implemented within a gateway module within the input/output device, wherein a control channel between the API module and gateway module is used to transport control messages between the gateway module and the API module for each of a plurality of network transport modules within the gateway module, and wherein for a network transport module within the gateway module which requires data stream communication, control messages are exchanged over the control channel and data stream communication is established via a separate communication channel between the API module and the gateway module.

11. Peripheral equipment as in claim 10 wherein the separate communication channel is initiated by:

the API module sending a connection request message to the gateway module;

the gateway module first responds by returning a connection acknowledgment message to the API module and forwarding the connection request to a remote host; and, the gateway module sending a confirmation indication message to the API module upon the gateway module establishing a connection with the remote host.

12. Peripheral equipment as in claim 10 wherein the separate communication channel is initiated by:

the gateway module sending a connection indication message to the API module upon the gateway module receiving a connect request from a remote host;

the API module responding by sending an accept request message to the gateway module; and, the gateway module responding by sending an accept acknowledgment message to the API module.

13. Peripheral equipment as in claim 10 wherein the separate communication channel is released by:

the API module sending an end of peripheral data message to the gateway module via the communication channel;

the API module sending an orderly release request to the gateway module via the control channel;

the gateway module responding by sending an orderly release acknowledgment message to the API module via the control channel;

the gateway module sending an end of host data message to the API module via the communication channel after the remote host sends an end of connection indication;

the gateway module sending an orderly release indication message to the API module via the control channel; and, the API module sending an end of host data acknowledgment message to the gateway module via the communication channel.

14. Peripheral equipment as in claim 10 wherein the separate communication channel is released by:

the gateway module sending an end of host data message to the API module via the communication channel;

the gateway module sending an orderly release indication message to the API module via the control channel;

the API module sending an end of peripheral data message to the gateway module via the communication channel;

the API module sending an orderly release request to the gateway module via the control channel;

the API module sending an end of host data acknowledgment message to the gateway module via the communication channel; and, the gateway module responding by sending an orderly release acknowledgment message to the API module via the control channel.

15. Peripheral equipment as in claim 10 wherein when the network transport module becomes disabled, the separate communication channel is released by:

the gateway module sending an end of host data message to the API module via the communication channel;

the gateway module sending a new state indication message to the API module via the control channel;

the API module sending an end of host data acknowledgment message to the gateway module via the communication channel; and, the API module sending a new state response message to the gateway module via the communication channel, the new state response message acknowledging receipt of the new state indication message.

16. Peripheral equipment as in claim 15 wherein the gateway module signals that the transport module is enabled by sending a new state indication message to the API module via the control channel, and the API module responds by sending a new state response message to the gateway module via the communication channel.

17. Peripheral equipment as in claim 10 wherein a local protocol address is bound to a previously opened datagram communication endpoint by:

the API module sending a bind request message to the gateway module, the bind request message including a bind sequence number; and, the gateway module sending a bind acknowledge message to the API module.

18. Peripheral equipment as in claim 10 wherein the API module obtains system parameters of the input/output device by:

the API module sending a system information request message to the gateway module; and, the gateway module sending a system information acknowledgment message to the API module, the system information acknowledgment message including information on the parameters of the input/output device.

19. A method for using an input/output device to connect peripheral equipment and a remote host using a network transport protocol, the method comprising the following steps:

(a) managing datagram communication endpoints within an application programming interface (API) module within the peripheral equipment;

(b) for each datagram communication endpoint within an application programming interface (API) module within the peripheral equipment, implementing a corresponding datagram communication endpoint within a gateway module within the input/output device;

(c) using a control channel between the gateway module and the API module to transport control messages between the gateway module and the API module, the control channel being used to transport control messages for a plurality of network transport modules; and, (d) for a network transport module which requires data stream communication, exchanging control messages over the control channel and establishing data stream communication via a separate communication channel between the gateway module and the API module.

20. A method as in claim 19 wherein in step (d) the separate communication channel is initiated by the following substeps:

sending, by the API module to the gateway module, a connection request message;

returning, by the gateway module to the API module, a connection acknowledgment message;

forwarding, by the gateway module to a remote host, the connection request; and, sending, by the gateway module to the API module upon the gateway module establishing a connection with the remote host, a confirmation indication message.

21. A method as in claim 19 wherein in step (d) the separate communication channel is initiated by the following substeps:

sending, by the gateway module to the API module upon the gateway module receiving a connect request from a remote host, a connection indication message;

sending, by the API module to the gateway module, an accept request message; and, sending, by the gateway module to the API module, an accept acknowledgment message.

22. A method as in claim 19 wherein in step (d) the separate communication channel is released by the following substeps:

sending, by the API module sending to the gateway module via the communication channel, an end of peripheral data message;

sending, by the API module to the gateway module via the control channel, an orderly release request;

sending, by the gateway module to the API module via the control channel, an orderly release acknowledgment message;

sending, by the gateway module to the API module via the communication channel after the remote host sends an end of connection indication, an end of host data message;

sending, by the gateway module to the API module via the control channel, an orderly release indication message; and, sending, by the API module to the gateway module via the communication channel, an end of host data acknowledgment message.

23. A method as in claim 19 wherein in step (d) the separate communication channel is released by the following substeps:

sending, by the gateway module to the API module via the communication channel, an end of host data message;

the gateway module to the API module via the control channel, an orderly release indication message;

sending, by the API module to the gateway module via the communication channel after possibly sending additional data, an end of peripheral data message;

sending, by the API module to the gateway module via the control channel, an orderly release request;

sending, by the API module to the gateway module via the communication channel, an end of host data acknowledgment message; and, sending, by the gateway module to the API module via the control channel, an orderly release acknowledgment message.

24. A method as in claim 19 wherein in step (d) when the network transport module becomes disabled, the separate communication channel is released by the following substeps:

sending, by the gateway module to the API module via the communication channel, an end of host data message;

sending, by the gateway module to the API module via the control channel, a new state indication message;

sending, by the API module to the gateway module via the communication channel, an end of host data acknowledgment message; and, sending, by the API module to the gateway module via the communication channel, a new state response message, the new state response message acknowledging receipt of the new state indication message.

25. A method as in claim 24 wherein in step (d) the gateway module signals that the transport module is enabled by the following substeps:

sending by the gateway module to the API module via the control channel, a new state indication message; and, sending by API module to the gateway module via the communication channel, a new state response message.

26. A method as in claim 19 wherein in step (d) a local protocol address is bound to a previously opened datagram communication endpoint by the following substeps:

sending, by the API module to the gateway module, a bind request message, the bind request message including a bind sequence number; and, sending, by the gateway module to the API module, a bind acknowledge message.

27. A method as in claim 19 wherein in step (d) the API module obtains system parameters of the input/output device by the following substeps:

sending, by the API module to the gateway module, a system information request message; and, sending, by the gateway module to the API module, a system information acknowledgment message, the system information acknowledgment message including information on the parameters of the input/output device.

28. An input/output device for connection to peripheral equipment having an application programming interface (API) module, the input/output device comprising:

a plurality of network transport modules;

a communication mechanism for communication with the peripheral equipment; and, a gateway module, coupled to each of the network transport modules and to the communication mechanism;

wherein for a network transport module that requires data stream communication, control messages are exchanged over a control channel and data stream communication is established via a separate communication channel between the gateway module and the API module.

29. An input/output device as in claim 28 wherein at least one datagram communication endpoint is generated within the API module.

30. An input/output device as in claim 29 wherein for each datagram communication endpoint within the API module within the peripheral equipment, a corresponding datagram communication endpoint is implemented within the gateway module.

31. An input/output device as in claim 28 wherein each network transport module implements a different network protocol.

* * * * *